United States Patent
Takahara

(10) Patent No.: US 11,902,853 B2
(45) Date of Patent: Feb. 13, 2024

(54) NON-TRANSITORY COMPUTER READABLE RECORDING MEDIUM, INFORMATION PROCESSING METHOD, AND SERVER DEVICE FOR PROVIDING REGION INFORMATION

(71) Applicant: NearMe Inc., Tokyo (JP)

(72) Inventor: Koichiro Takahara, Tokyo (JP)

(73) Assignee: NEARME INC., Tokyo (JP)

( * ) Notice: Subject to any disclaimer, the term of this patent is extended or adjusted under 35 U.S.C. 154(b) by 333 days.

(21) Appl. No.: 17/408,518

(22) Filed: Aug. 23, 2021

(65) Prior Publication Data

US 2021/0385611 A1 Dec. 9, 2021

Related U.S. Application Data

(63) Continuation of application No. PCT/JP2020/007916, filed on Feb. 27, 2020.

(30) Foreign Application Priority Data

Feb. 28, 2019 (JP) .................................. 2019-036799

(51) Int. Cl.
*H04W 4/021* (2018.01)
*G06Q 10/02* (2012.01)
(Continued)

(52) U.S. Cl.
CPC ............ *H04W 4/021* (2013.01); *G06Q 10/02* (2013.01); *G06Q 20/0457* (2013.01);
(Continued)

(58) Field of Classification Search
CPC ..... H04W 4/021; H04W 4/025; H04W 4/029; G06Q 10/02; G06Q 20/0457; G06Q 50/01;
(Continued)

(56) References Cited

U.S. PATENT DOCUMENTS

| 2004/0030832 A1* | 2/2004 | Squibbs ............... G06F 8/4434 |
| | | 711/E12.056 |
| 2005/0026631 A1* | 2/2005 | Hull ....................... H04L 67/10 |
| | | 455/456.3 |

(Continued)

FOREIGN PATENT DOCUMENTS

| JP | 2001-195459 A | 7/2001 |
| JP | 2005-18697 A | 1/2005 |

(Continued)

OTHER PUBLICATIONS

International Search Report and Written Opinion dated Jun. 2, 2020, received for PCT Application PCT/JP2020/007916, Filed on Feb. 27, 2020, 11 pages including English Translation.

(Continued)

*Primary Examiner* — Don N Vo
(74) *Attorney, Agent, or Firm* — XSENSUS LLP

(57) ABSTRACT

A non-transitory computer-readable recording medium storing a computer executable program which, when executed by a computer, cause the computer to; receive a location information from a terminal device; identify, from among data stored in the computer, the region information based on the location information, the region information being posted by a region affiliated person, the region affiliated person being a person affiliated with a region including the location, and the region affiliated person including; send the region information to the terminal device; send display selection information for selecting a guide type to the terminal device and, in response to a selection of the guide type from the terminal device, accept the selection of the guide type. The region information includes information relevant to accepting a reservation for a on-site human guided tour and contents relevant to a non-human guided tour.

20 Claims, 43 Drawing Sheets

(51) Int. Cl.
*G06Q 20/04* (2012.01)
*G06Q 50/00* (2012.01)
*G06Q 50/14* (2012.01)
*G06F 3/0482* (2013.01)

(52) U.S. Cl.
CPC ............. *G06Q 50/01* (2013.01); *G06Q 50/14* (2013.01); *G06F 3/0482* (2013.01)

(58) Field of Classification Search
CPC .. G06Q 50/14; G06Q 20/123; G06Q 20/3223; G06Q 20/3224; G06Q 20/3267; G06Q 30/0601; G06F 3/0482
USPC ....................................... 455/456.1
See application file for complete search history.

(56) References Cited

U.S. PATENT DOCUMENTS

| | | | |
|---|---|---|---|
| 2013/0129252 A1 | 5/2013 | Lauper et al. | |
| 2014/0136100 A1* | 5/2014 | Drysdale ............ | G01C 21/3679 |
| | | | 701/461 |
| 2014/0229287 A1 | 8/2014 | Ben-David et al. | |

FOREIGN PATENT DOCUMENTS

| | | |
|---|---|---|
| JP | 2012-88856 A | 5/2012 |
| JP | 2014-16870 A | 1/2014 |
| JP | 2014-174907 A | 9/2014 |
| JP | 2015-505384 A | 2/2015 |
| JP | 2018-147297 A | 9/2018 |
| JP | 2019-28669 A | 2/2019 |

OTHER PUBLICATIONS

Notice of Reasons for Refusal dated Apr. 20, 2021, received for JP Application 2021-502353, 14 pages including English Translation.

* cited by examiner

FIG.3

| Region | Location Range | No. | Name | Contents | Charge | Reviews | Category | Time | Region Affiliated Person | Rank |
|---|---|---|---|---|---|---|---|---|---|---|
| A | ... | 1 | ... | ... | 3,000 yen | ... | History | 60 min. | ... | Professional |
| | | 2 | ... | ... | 2,000 yen | ... | Nature | 90 min. | ... | Semi-Professional |
| | | 3 | ... | ... | 1,000 yen | ... | Art | 60 min. | ... | None |
| | | ... | ... | ... | ... | ... | ... | ... | ... | ... |
| B | ... | 1 | ... | ... | ... | ... | ... | ... | ... | ... |
| | | 2 | ... | ... | ... | ... | ... | ... | ... | ... |
| | | 3 | ... | ... | ... | ... | ... | ... | ... | ... |
| | | ... | ... | ... | ... | ... | ... | ... | ... | ... |

| No. | Name | Tourist Spot | Location Information | Starting Time |
|-----|------|--------------|---------------------|---------------|
| 1 | ... | ... | ... | 0 min. |
|   |     | ... | ... | 20 min. |
|   |     | ... | ... | 40 min. |
| 2 | ... | ... | ... | 0 min. |
|   |     | ... | ... | 20 min. |

| Tourist Spot | Location | Region Information No. | Content | Season | Time Zone | Weather |
|---|---|---|---|---|---|---|
| ... | ... | ... | Still Image | Spring | Morning | Fine |
| | | ... | ... | ... | ... | ... |
| | | ... | ... | ... | ... | ... |
| ... | ... | ... | ... | ... | ... | ... |
| | | ... | ... | ... | ... | ... |
| | | ... | ... | ... | ... | ... |

| Level | Detected Location | Number of Times Detected | User |
|---|---|---|---|
| 1 | ... | ... | ... |
|  | ... |  | ... |
|  | ... |  | ... |
|  |  |  | ... |
|  |  |  | ... |
| 2 | ... | ... | ... |
|  | ... |  | ... |
|  | ... |  | ... |
|  |  |  | ... |
|  | ... |  | ... |

| User | Friends | Category |
|---|---|---|
| ... | ... | User |
|  | ... | SNS |
|  | ... | User |
| ... | ... | User |
|  | ... | User |
|  | ... | User |
|  | ... | SNS |

FIG.41

| Feature of image of object or shop | Location information | Sightseeing spot | Merchandise information | Event information | Related image | Related video |
|---|---|---|---|---|---|---|

NON-TRANSITORY COMPUTER READABLE RECORDING MEDIUM, INFORMATION PROCESSING METHOD, AND SERVER DEVICE FOR PROVIDING REGION INFORMATION

CROSS-REFERENCE TO RELATED APPLICATIONS

This application is a continuation of International Patent Application No. PCT/JP2020/007916, filed on Feb. 27, 2020, which claims priority from Japanese Patent Application No. 2019-036799, filed on Feb. 28, 2019, both of which are incorporated by reference herein in its entirety.

TECHNICAL FIELD

The present disclosure relates to a software program, an information processing method, and a server device.

This application claims a priority right based on Japanese Application No. 2019-03679 filed on Feb. 28, 2019, the entire descriptions of which are incorporated herein by reference.

BACKGROUND

Various types of information processing systems in communication with terminal devices via network for providing region information on traveling destinations to users of the terminal devices have been proposed (Patent Document 1, for example).

[Patent Document 1] Japanese Unexamined Patent Application Publication No. 2015-162142 (JP-A-2015-162142)

SUMMARY

A non-transitory computer-readable recording medium storing a computer executable program which, when executed by a computer, cause the computer to: receive location information from a terminal device, the location information indicating a location of the terminal device; identify, from among data stored in the computer, the region information based on the location information, the region information being posted by a region affiliated person, the region affiliated person being a person affiliated with a region including the location, and the region affiliated person including a tour-guide person; send the region information to the terminal device, the region information including information relevant to accepting a reservation for a on-site human guided tour of a tourist spot conducted by the tour-guide person, and contents relevant to a non-human guided tour of the tourist spot provided by the tour-guide person; send display selection information to the terminal device, to display a guide type selection screen on the user terminal device, the guide type selection screen including an icon for the reservation of the human guided tour and an icon for the non-human guided tour; and, in response to a selection of the guide type from the terminal device, accept the selection of the guide type.

BRIEF DESCRIPTION OF DRAWINGS

FIG. 3 is a view illustrating an example of a layout of records of a region information database in accordance with the present disclosure.

FIG. 5 is a view illustrating an example of a layout of records of a video information database in accordance with the present disclosure.

FIG. 6 is a view illustrating an example of a layout of records of a spot information database in accordance with the present disclosure.

FIG. 7 is a view illustrating an example of a layout of records of a level information database in accordance with the present disclosure.

FIG. 31 is a view illustrating an example of a layout of records of a friend information database in accordance with the present disclosure.

FIG. 41 is a view illustrating an example of a layout of records of a merchandise database that stores information relevant to objects or shops in accordance with the present disclosure.

DETAILED DESCRIPTION

Technical Problem

Figure 1:
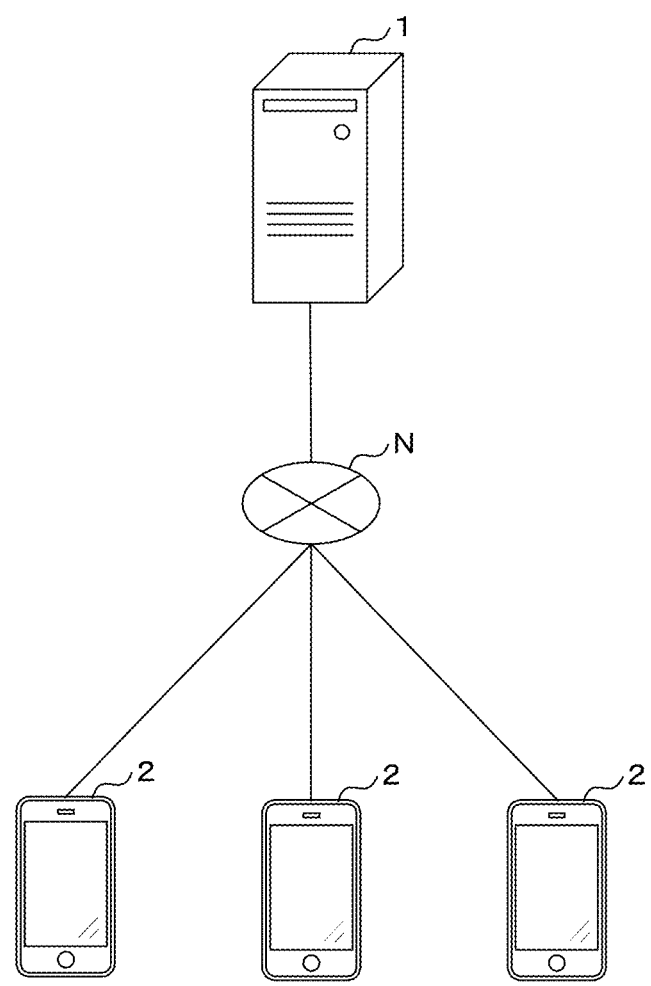
FIG. 1 is a schematic view showing an example of an information processing system in accordance with the present disclosure.

Although various types of information processing systems have been proposed as above, a system, a method, and a non-transitory computer-readable recording medium storing a software program that can provide a wider range of region information has been awaited.

The present disclosure was made in view of such circumstances. Its object is to provide a software program, an information processing method, and a server device that can provide users a wide range of region information.

Solution to Problem

A non-transitory computer-readable recording medium storing a software program according to an embodiment of the present disclosure acquires location information, and displays region information corresponding to the acquired location information. The region information is posted by a region affiliated person, who is a person affiliated with the region.

According to the embodiment of the present disclosure, since the region information is posted by the region affiliated person, a wide range of various types of region information based on the location information posted by each region affiliated person can be displayed. Thus, users can be provided with a wide range of the region information.

The non-transitory computer-readable recording medium storing the software program according to the embodiment of the present disclosure accepts selection of the region information. The region affiliated person includes a tour-guide person, and the region information includes reservations of guided tours conducted by the tour-guide person or contents affiliated to the tour-guide person.

According to the embodiment of the present disclosure, the tour-guide person, as the region affiliated person, can provide the region information held by himself/herself, and can give a guided tour to tourists without actually being in a region relating to the region information.

The non-transitory computer-readable recording medium storing the software program according to the embodiment of the present disclosure displays a first screen showing a plurality of the selectable contents, and, upon one of the contents being selected on the first screen, displays a second screen showing a plurality of selectable guide types of the contents and accepting selection of the guide types.

According to the embodiment of the present disclosure, the user can use a guided tour through easy procedures.

In the non-transitory computer-readable recording medium storing the software program according to the embodiment of the present disclosure, the contents include a video, and a starting time of the video play is decided based on the location information.

According to the embodiment of the present disclosure, the video can be played in a form corresponding to the current location of the user.

The non-transitory computer-readable recording medium storing the software program according to the embodiment of the present disclosure accepts a settlement for a charge of the guided tour based on the contents.

According to the embodiment of the present disclosure, if there are charges to be paid for the usage of the region information or entrance fees to be paid for the tours etc., such fees and the charges can be settled at the same time, which improves convenience.

The non-transitory computer-readable recording medium storing the software program according to the embodiment of the present disclosure displays the charge for the guided tour based on the region information using AR (Augmented Reality), and accepts the settlement for the charge.

According to the embodiment of the present disclosure, if there are charges to be paid for the usage of the region information or entrance fees to be paid during the tour etc., such fees and the charges can be settled at the same time, which improves convenience.

The non-transitory computer-readable recording medium storing the software program according to the embodiment of the present disclosure creates a tourist route based on a base location and the region information.

According to the embodiment of the present disclosure, the tourist route that matches the user's tour style can be displayed, which improves convenience.

The non-transitory computer-readable recording medium storing the software program according to the embodiment of the present disclosure creates a tourist route based on the user's schedule information, the base location, and the region information.

According to the embodiment of the present disclosure, the tourist route that matches the user's tour style can be automatically created and displayed, which improves convenience.

The non-transitory computer-readable recording medium storing the software program according to the embodiment of the present disclosure creates a tourist route based on restricting information, the base location, and the region information, the restricting information including information on locations to be visited or locations not to be visited.

According to the embodiment of the present disclosure, the restricting information is taken into consideration, and the tourist route that matches the user's tour style can be automatically created and displayed, which improves convenience.

The non-transitory computer-readable recording medium storing the software program according to the embodiment of the present disclosure creates a tourist route based on information about the users who want to share a taxi ride, the base location, and the region information.

According to the embodiment of the present disclosure, the shared taxi fare is taken into consideration, and the tourist route that matches the user's tour style can be automatically created and displayed, which improves convenience.

The non-transitory computer-readable recording medium storing the software program according to the embodiment of the present disclosure creates a tourist route based on information about the tour-guide person, the base location, and the region information.

According to the embodiment of the present disclosure, the tourist route that matches the user's tour style can be automatically created, and the automatically created tourist route and the tour-guide person information can be displayed, which improves convenience.

The non-transitory computer-readable recording medium storing the software program according to the embodiment of the present disclosure displays user's reviews of the region affiliated person or the region information in association with the region affiliated person or the region information.

According to the embodiment of the present disclosure, the user can refer to the reviews of the region affiliated person or the region information as guidelines when using the region information.

The non-transitory computer-readable recording medium storing the software program according to the embodiment of the present disclosure accepts input of the user reviews of the region affiliated person or the region information.

According to the embodiment of the present disclosure, the user can give reviews to the region affiliated person or the region information.

The non-transitory computer-readable recording medium storing the software program according to the embodiment of the present disclosure accepts selection of the region information, and, after accepting the selection, displays the selected region information posted by the region affiliated person while continuously acquiring the location information of the user to further display the posted region information corresponding to the acquired location information.

According to the embodiment of the present disclosure, the user can be further provided with the region information corresponding to a location that can be reached by the user while receiving the tour guide based on the region information.

The non-transitory computer-readable recording medium storing the software program according to the embodiment of the present disclosure displays a description of an object in the tour based on the region information using AR, and accepts update of the description of the object from the user.

According to the embodiment of the present disclosure, the user can alter the description of the object in the tour based on the region information so that the description includes higher convenient information.

The non-transitory computer-readable recording medium storing the software program according to the embodiment of the present disclosure accepts a change in the location information, and, after accepting the change, displays the region information posted by the region affiliated person corresponding to the new location information.

According to the embodiment of the present disclosure, when the user using the region information changes his/her location, the region information of a new location to which the user has moved can be provided.

The non-transitory computer-readable recording medium storing the software program according to the embodiment of the present disclosure registers the user as a local member of the region according to a history of the location information of the user, and displays the registered local member with a given level.

According to the embodiment of the present disclosure, the user can obtain information on other users, such as a local resident, who are familiar with the region.

The non-transitory computer-readable recording medium storing the software program according to the embodiment of the present disclosure displays the users in the region corresponding to the acquired location information.

According to the embodiment of the present disclosure, by displaying the users that correspond to the acquired location information, the users can exchange information more widely.

The non-transitory computer-readable recording medium storing the software program according to the embodiment of the present disclosure accepts requests on region information from a plurality of the users, and displays the region information corresponding to the requests from the plurality of the users.

According to the embodiment of the present disclosure, the same region information can be provided to the plurality of the users who have the same requests about the region information.

An information processing method according to an embodiment of the present disclosure lets a computer to execute processing for acquiring location information from a user's terminal device and for outputting to the terminal device region information posted by a region affiliated person of a region corresponding to the acquired location information.

According to the embodiment of the present disclosure, the region information is posted by the region affiliated person of the region, and thus a wide range of various region information, posted by each region affiliated person, based on the location information, can be displayed. Thus, the user can be provided with a wide range of region information.

A server device according to an embodiment of the present disclosure includes an acquisition unit that acquires location information from a user terminal device, and an output unit that outputs, to the terminal device, region information posted by a region affiliated person of the region corresponding to the location information acquired by the acquisition unit.

According to the embodiment of the present disclosure, the region information is posted by the region affiliated person of the region, and thus a wide range of various region information, posted by each region affiliated person, based on the location information, can be displayed. Thus, the user can be provided with a wide range of region information.

Advantageous Effect of Disclosure

One of the embodiments of the present disclosure can provide a wide range of region information to users.

Hereinafter, a software program, an information processing method, and a server device according to the present disclosure will be described in detail with reference to the accompanying drawings. Any of the embodiments 1-10 described hereinafter may be freely combined with each other.

Embodiment 1

Hereinafter, an embodiment of the present disclosure will be described with reference to the accompanying drawings. FIG. 1 is a schematic view showing an example of an information processing system. The information processing system includes an information-processing device 1 and a plurality of terminal devices 2. The devices are connected with each other for communication by a network N, such as the Internet.

The information-processing device 1 is an information-processing device, such as a server computer or a personal computer that processes, transmits, and receives various information. The information-processing device 1 in the present embodiment shall be a server computer, and will be hereinafter rephrased as a server 1.

The server 1 provides each user who owns the terminal device 2 an application service in which the users can interact with each other using the network N. Also, the server 1 in the present embodiment acquires region information posted by users etc. using the terminal devices 2 and provides the region information to users such as tourists who requested the region information. Here, the region information is related to a corresponding region, and includes videos, pictures, texts, sounds, as well as contents including combinations of the above, and information about sightseeing relating to the corresponding region. The region information also includes information that is used to provide contents such as accepting reservations for guided tours conducted by local tour-guide persons. The region information further includes contents related to tourist sites, restaurants, events, etc.

The terminal device 2 is an information-processing terminal that processes various information. Examples of the terminal device 2 are a smartphone, a tablet terminal, and a personal computer. The terminal device 2 in the present embodiment shall be a smartphone, and will be rephrased hereinafter as a terminal 2 for simplification.

Figure 2:
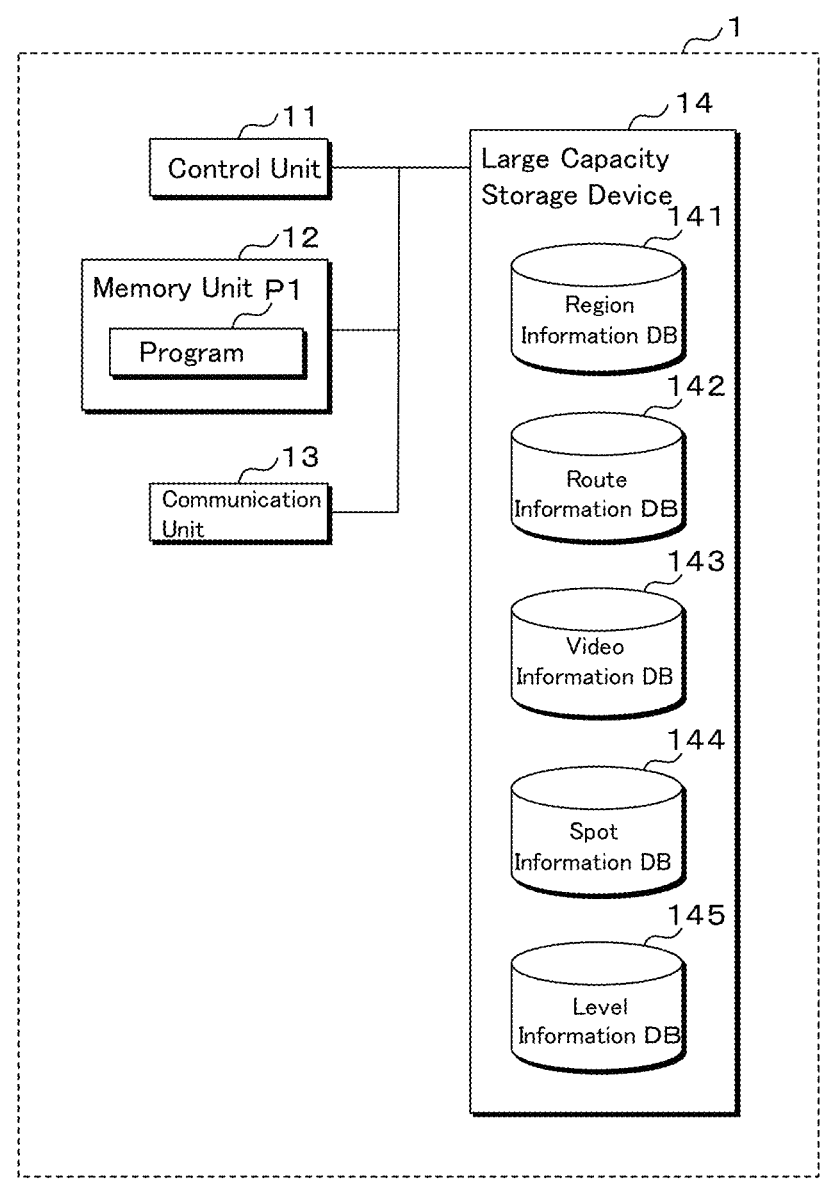
FIG. 2 is a block diagram showing an example of a configuration of a server in accordance with the present disclosure.

FIG. 2 is a block diagram showing a configuration of the server 1. The server 1 includes a control unit 11, a memory unit 12, a communication unit 13, and a large capacity storage device 14.

The control unit 11 includes an arithmetic-processing device, such as a CPU (Central Processing Unit) or a MPU (Micro-Processing Unit). The control unit 11 processes various information and controls the server 1 through reading out and executing a program P1 stored in the memory unit 12. The memory unit 12 includes a memory element, such as RAM (Random Access Memory) or ROM (Read Only Memory). The memory unit 12 stores the program P1 or data etc. to be used by the control unit 11 for the processing. The memory unit 12 also temporarily stores data etc. that is to be used by the control unit 11 for the arithmetic processing. The communication unit 13 includes a processing circuit etc. for communication processing, and sends information via the network N to and from the terminals 2.

The large capacity storage device 14 includes a hard disk, for example. The large capacity storage device 14 stores a region information DB 141 etc. The region information DB 141 stores data that is related to the region information.

The functionality of the elements disclosed herein may be implemented using circuitry or processing circuitry which includes general purpose processors, special purpose processors, integrated circuits, ASICs ("Application Specific Integrated Circuits"), CPU (a Central Processing Unit), a micro processing unit (MPU), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

FIG. 3 is a view illustrating an example of a layout of records of the region information DB 141. The region information is stored as shown in FIG. 3: a location range is set for each region to determine the region, and the region information corresponding to the set region is stored corresponding to each number (a "No." column in the drawing). Here, for example, the regions correspond to prefectures, cities, towns, villages, and so on, and the location range is set based on location coordinates or the like that can be measured by GPS (Global Positioning System).

The region information DB 141 stores, corresponding to each number, a name of the region information, contents of the region information that are to be displayed or played on the user's terminal 2, a charge for usage of the information, reviews from the users, a category of the information such as history, nature, art, etc., time required for display or playback, the region affiliated person who posted the information, a rank of the region affiliated person, and so on. Here, the region affiliated person represents a resident of the region or a tour-guide person, etc., who is affiliated with the region. The rank of the region affiliated person is, for example, "professional" or "semi-professional": a "professional" person represents a tour-guide person who receives a remuneration for a tour guide, for example; and a "semi-professional" person represents a local member, which will be described below. Also, the region affiliated persons include a volunteer tour-guide person. Furthermore, the region affiliated person is not limited to a natural person, and may be a company or a government organization that is located in the region. The tour-guide person is someone who guides the region, regardless of whether the person is a guide by profession or not.

Figure 4:
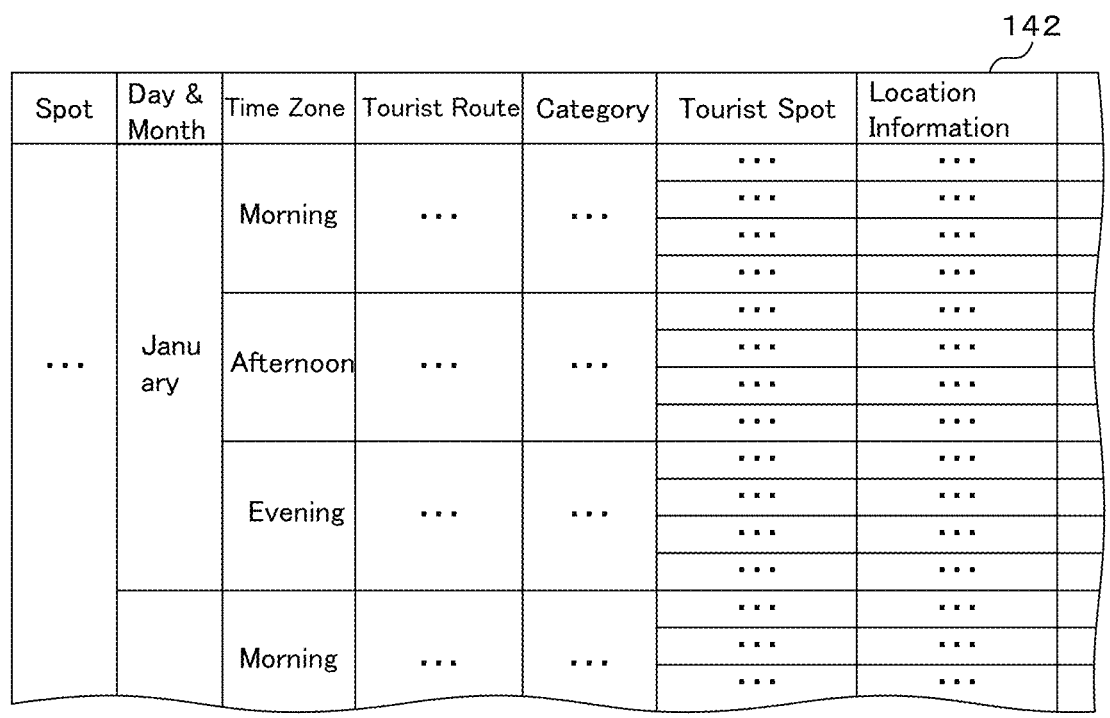
FIG. 4 is a view illustrating an example of a layout of records of a route information database in accordance with the present disclosure.

FIG. 4 is a view illustrating an example of a layout of records of a route information DB 142. The route information is information related to a tourist route including a plurality of tourist spots. The route information may be tourist information posted by the tour-guide person, or may be set in advance. As shown in FIG. 4, the tourist route is set for each prescribed spot, corresponding to day and month, and a time zone. The prescribed spot may be a range of the location coordination of an accommodation facility etc. set by GPS function, for example. Months may be set as the day and month, and "Morning", "Afternoon", and "Evening" may be set for the time zone. A title of the tourist route is stored in a "Tourist route" column. A category, a plurality of tourist spots, and location information of the tourist spots, which will be described below, are stored corresponding to each tourist route.

FIG. 5 is a view illustrating an example of a layout of records of a video information DB 143. The video information DB 143 stores details of video region information. As shown in FIG. 5, the video information DB stores, for each number of the region information, a name of the region information, tourist spots guided in the video, the location information of the tourist spots, and starting times in the video where the guide of the tourist spots starts.

FIG. 6 is a view illustrating an example of a layout of records of a spot information DB 144. The spot information DB 144 stores the region information, which is posted by the tour-guide person, corresponding to the prescribed tourist spots. The same tourist spot stores the region information that corresponds to different seasons and time zones etc. As shown in FIG. 6, corresponding to the tourist spot and the location information of the tourist spot, the numbers of the region information, contents, seasons, time zones, and weather, which have been posted, are stored. Here, the content is a type of content, such as "still image" or "motion video"; the season may be either spring, summer, fall, or winter; the time zone may be either morning, afternoon, or evening; and the weather may be fine, cloudy, etc.

Figure 7:
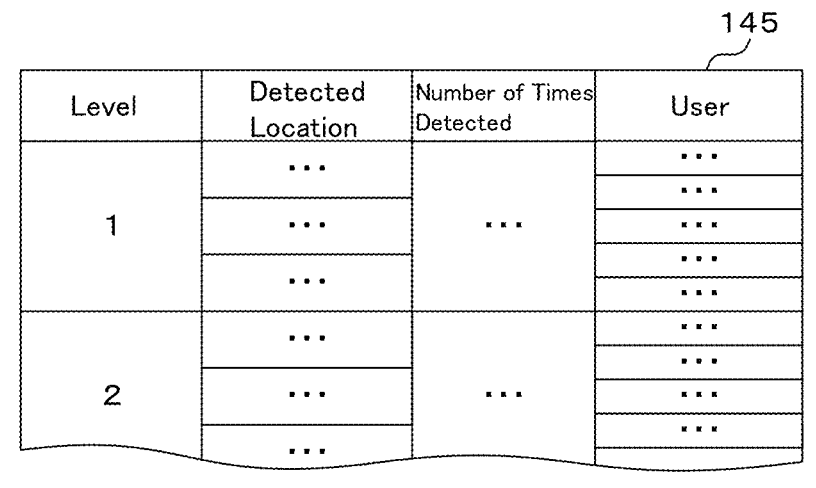

FIG. 7 is a view illustrating an example of a layout of records of a level information DB 145. The level information represents a level that is to be set for a local member, which will be described below. As shown in FIG. 7, corresponding to each level, detected locations, detected number of times, and users registered at the level are stored. Here, the detected number of times and the detected locations represent the number of times and the locations of the location information detected by a position detector of the terminal 2, which will be described below.

In the present embodiment, the memory unit 12 and the large capacity storage device 14 may be configured as one storage device. Also, the large capacity storage device 14 may include a plurality of storage devices. Also, the large capacity storage device 14 may be an external storage device connected to the server 1.

Also, the server 1 is not limited to the above configuration, and may include, for example, an input unit that receives operation input, a display unit that displays information relevant to the server 1, and a reading unit that reads information stored in a mobile memory media. The server 1 may be configured of one computer, or may be configured of distributed computers.

Figure 8:
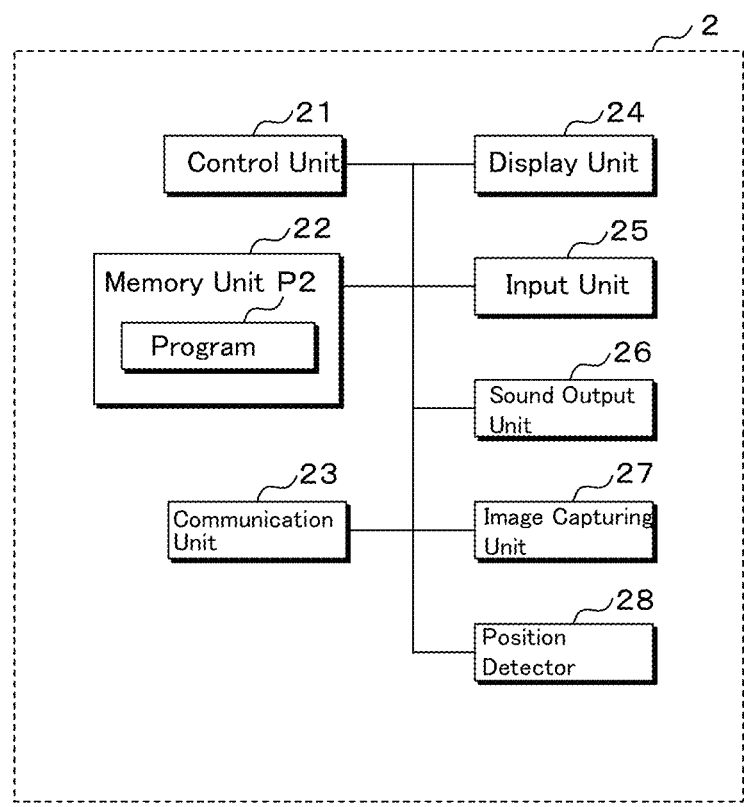
FIG. 8 is a block diagram showing an example of a configuration of a terminal device in accordance with the present disclosure.

FIG. 8 is a block diagram showing an example of a configuration of the terminal 2. The terminal 2 includes a control unit 21, a memory unit 22, a communication unit 23, a display unit 24, an input unit 25, a sound output unit 26, an image capturing unit 27, and a position detector 28.

The control unit 21 includes an arithmetic processing device, such as a CPU or a MPU, and processes various information and controls the terminal 2 by reading out and executing a program P2 stored in the memory unit 22. The memory unit 22 includes a memory element, such as RAM or ROM, which stores the program P2 or data etc. that are to be used by the control unit 21 for the processing. The memory unit 22 also temporarily stores data etc. that is to be used by the control unit 21 for the arithmetic processing. The program P2 is acquired from the server 1 by downloading and stored in the memory unit 22.

The communication unit 23 is a communication module that carries out a wireless or wired communication, for transmitting information in and out via the network N. The display unit 24 has a screen such as a liquid crystal display or an organic EL (Electro Luminescence) display, for displaying images sent from the control unit 21. The input unit 25 is a touch panel or pressing buttons provided on the display unit 24 for receiving an input operation from the user. The sound output unit 26 is a speaker for sound and voice output. The image capturing unit 27 includes a CCD (Charge Coupled Device) camera or a CMOS (Complementary Metal Oxide Semiconductor) camera for taking pictures. The position detector 28 detects the location of the terminal 2 by using GPS, for example.

The terminal 2 in the present embodiment is not limited to the above configuration, and may include a sound input unit for sound input, such as a microphone, and a reading unit for reading information stored in a mobile memory media, for example.

The functionality of the elements disclosed herein may be implemented using circuitry or processing circuitry which includes general purpose processors, special purpose processors, integrated circuits, ASICs ("Application Specific Integrated Circuits"), CPU (a Central Processing Unit), a micro processing unit (MPU), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

Figure 9:
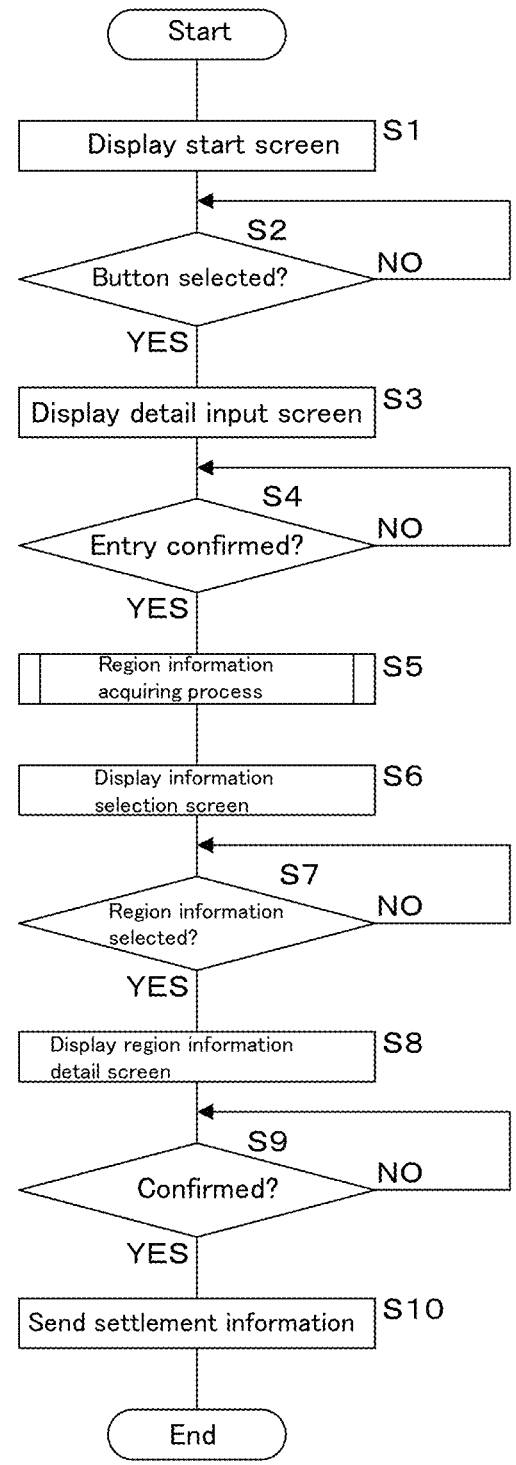
FIG. 9 is a flowchart showing a procedure of a starting process of a guided tour in accordance with the present disclosure.

FIG. 9 is a flowchart showing a procedure of a starting process of a guided tour. The control unit 21 executes the starting process of a guided tour when the terminal 2 activates the program P2. Details will be described hereinafter.

Figure 10:
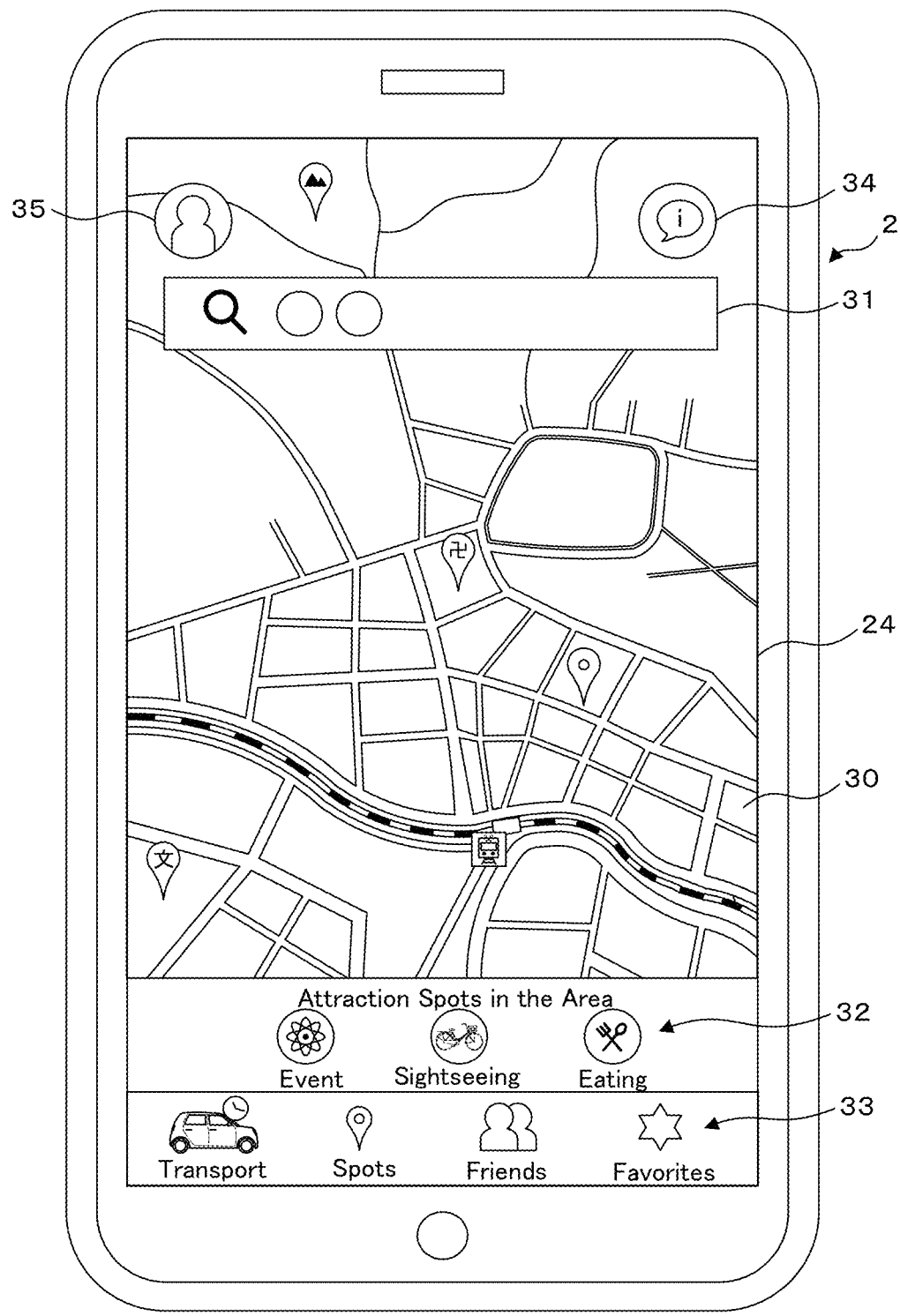
FIG. 10 is a view illustrating an example of a starting screen in accordance with the present disclosure.

The control unit 21 displays a starting screen of a guide process on the display unit 24 (S1). FIG. 10 is an illustration of an example of the starting screen. As shown in FIG. 10, the starting screen shows a map section 30, an input box 31, a purpose input section 32, an item selection section 33, a notification section 34, and a user display section 35. The map section 30 automatically displays a map of an area around the current location by using the terminal 2's own GPS function, for example. The user of the terminal 2 can input a desired name of a place into the input box 31 by using the input unit 25. For example, by touching a search mark inside the input box 31, the map section 30 shows a map around the input place. The map section 30 may be in a form that can be zoomed in or out by pinching in or out.

The purpose input section 32 displays buttons for different purposes, such as "Event", "Sightseeing", and "Meals", and selecting the button displays a screen specified for each of the purposes. The item selection section 33 displays item buttons, such as "Transport", "Spot", "Friends", and "Favorites", and selecting the button displays a screen specified for each of the items. In FIG. 10, the "Spot" item is selected and the starting screen of the guide process according to this item is shown. While the program 2 is activated, the notification section 34 notifies the region information such as traffic information by a pop-up when the public administration or the like dispatches such information in the region related to the map shown in the map section 30. In this way, the user using the region information can recognize the other region information displayed by the pop-up. The user display section 35 displays the user's preset profile image or an avatar image representing the user.

Figure 11:
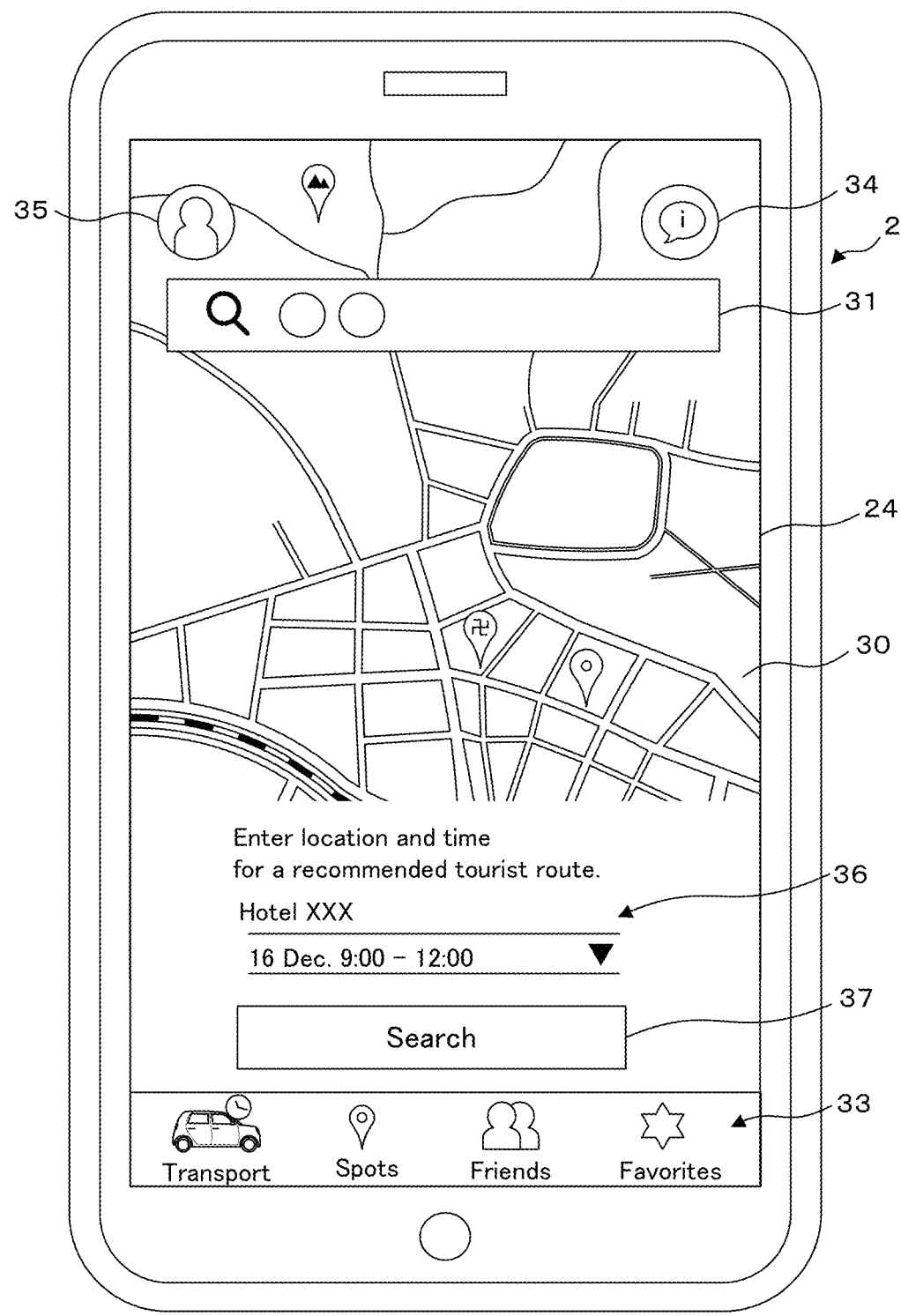
FIG. 11 is a view illustrating an example of a detail input screen in accordance with the present disclosure.

The control unit 21 checks if any of the buttons in the purpose input section 32 is selected or not (S2). If the button is selected (S2: YES), the control unit 21 displays a detail input screen corresponding to the button (S3). If the button is not selected (S2: NO), the control unit 21 returns the process back to the step S2. FIG. 11 is a view illustrating an example of the detail input screen. FIG. 11 shows the detail input screen when the "Sightseeing" button being pressed. The detail input screen shows a detail input section 36 and a confirm button 37 under the map section 30. The user can enter a starting point, such as a name of a hotel, a date, and a time zone, and then confirm the entry by pressing the confirm button (shown as a "Search" button in the drawing). If the starting point is entered, the starting point becomes a base location, and a tourist route around the starting point will be shown. Also, if the date and the time zone are entered, a tour time will be set from the date and the time zone, and a tourist route that can be toured within the tour time will be shown. Also, contents may be entered into the detail input section 36 by an automatic information acquisition, in which the control unit 21 follows the program P2 to retrieve data from an e-mail or the like that includes information of an itinerary arranged by a travel agency. As shown in FIG. 11, an operation guidance may be displayed between the detail input section 36 and the map section 30.

Then, the control unit 21 checks whether the confirm button 37 is pressed and the entry is confirmed or not (S4). If the entry is not confirmed (S4: NO), the control unit 21 returns the process back to the step S4. If the entry is confirmed (S4: YES), the control unit 21 performs a region information acquiring process (S5), which will be described below. After the region information acquiring process, the terminal device 2 communicates with the server 1 using the communication section 23 to retrieve the region information. Here, the control unit 21 refers to the region information DB 141, the route information DB 142, the video information DB 143, and the spot information DB 144 for acquisition of the region information.

Figure 12:
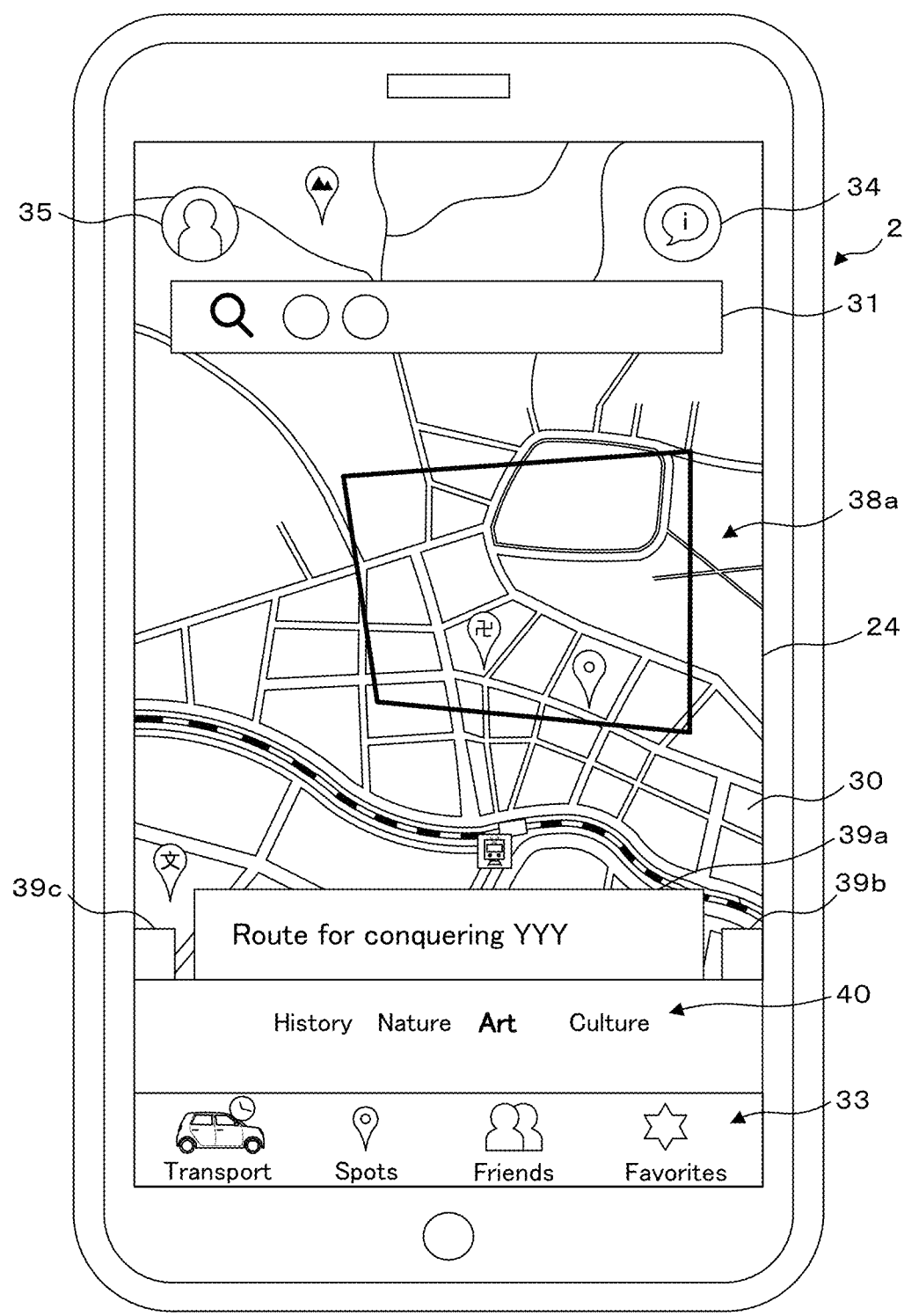
FIG. 12 is a view illustrating an example of an information selection screen in accordance with the present disclosure.
Figure 13:
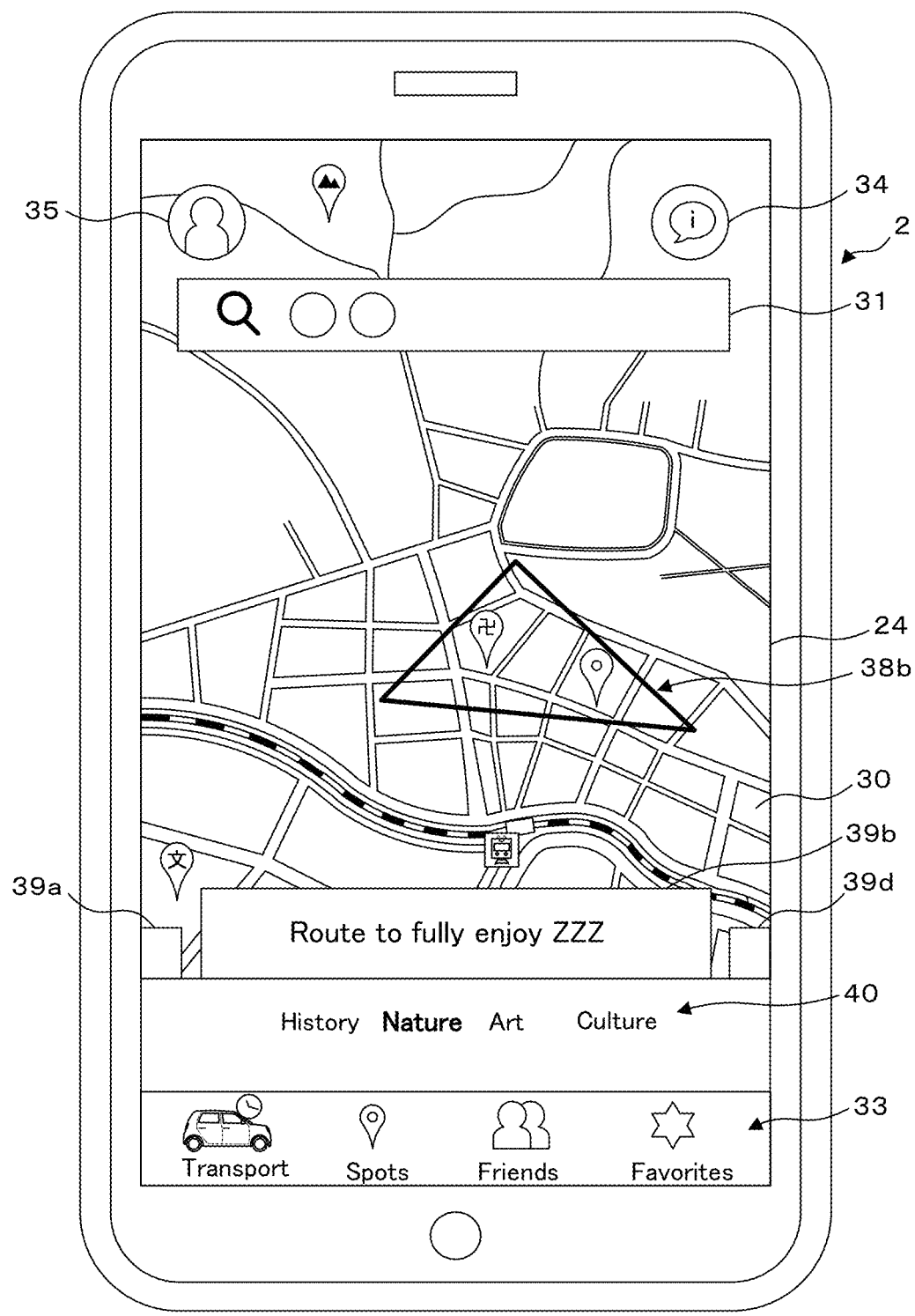
FIG. 13 is a view illustrating an example of the information selection screen in accordance with the present disclosure.

Then, the control unit 21 displays an information selection screen on the display section 24 (S6). FIG. 12 and FIG. 13 are views illustrating examples of the information selection screen. In the information selection screen, a route line 38*a* is shown in FIG. 12 and a route line 38*b* is shown in FIG. 13 over the map section 30. The route line 38*a* and the route line 38*b* are created by the program P2 based on the tour time such as the date and the time period, the base location such as the starting point, and the region information entered on the detail input screen. The user selects the region information through the route line 38*a*. The server 1 may create the route lines. The route lines 38*a* and 38*b* are the tourist routes that are determined according to the prescribed category, and names of the tourist routes are displayed in tabs 39*a* to 39*d* under the map section 30. The route lines 38*a* and 38*b* are created based on the location information of the tourist spots in the route information based on the route information DB 142, which has been retrieved by the terminal 2. For example, touching any one of the tabs 39*a* to 39*d* selects the region information and changes the screen to a region information detail screen, which will be described below. The tourist route may include the plurality of the tourist spots, or may be formed of only one of the tourist spots. Also, the tourist route may display only the starting point and the tourist spots, without the route lines connecting between the starting points and the tourist spots.

Also, the information selection screen includes a category display section 40. The category display section 40 displays prescribed categories ("History", "Nature", "Arts", and "Culture" are displayed in FIG. 12 and FIG. 13), and touching each title, for example, can select the category. After selecting the category, the corresponding route lines and tabs are displayed. Alternatively, users may enter keywords for entering the categories, and the route lines may be displayed based on the user's past usage history or location information history.

In FIG. 12, the route line 38*a*, the tab 39*a*, and the category "Arts" correspond to each other. In FIG. 13, the route line 38*b*, the tab 39*b*, and the category "Nature" correspond to each other. The selected category is shown in boldface on the information selection screen. The tabs 39*c* and 39*d* correspond to the categories "History" and "Culture" and to the route lines, which are omitted in the drawings, respectively. The route lines and the tabs are selected on the display unit 24, for example.

A route following each of the route lines includes the plurality of the tourist spots. Here, among the plurality of tourist spots, the route focusing on only the tourist spots with high user reviews may be displayed. If the limited tourist spots are used, other route lines for different routes may also be displayed.

Figure 14:
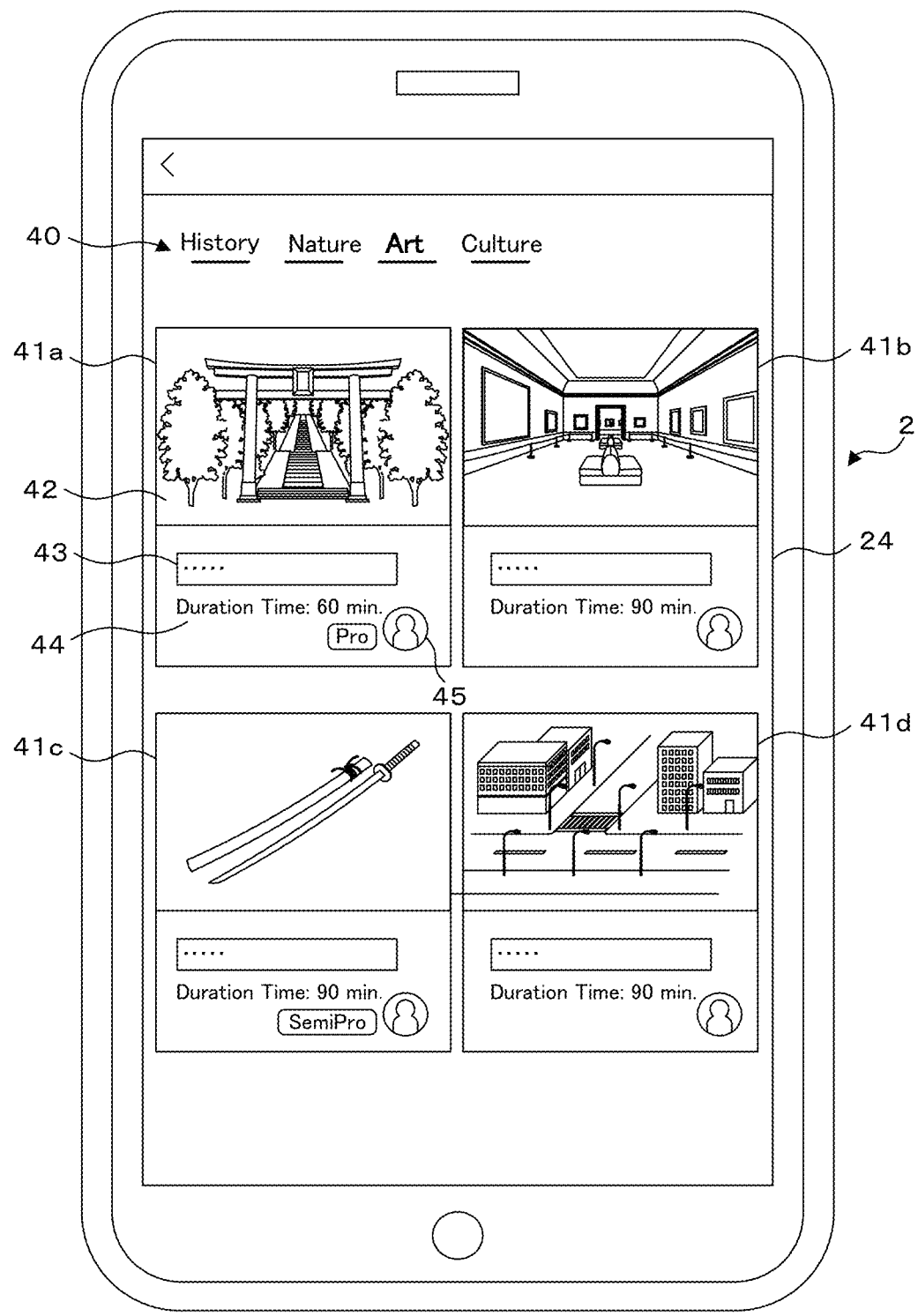
FIG. 14 is a view illustrating an example of the information selection screen in accordance with the present disclosure.

Also, the information selection screen may be in another form. FIG. 14 is an illustration showing another example of the information selection screen. The information selection screen may include, as shown in FIG. 14, the category display section 40 similarly as in FIG. 12 and FIG. 13, and simplified display sections 41*a* to 41*d*, which are displayed under the category display section 40. An operation such as vertically swiping the screen may alternate between the screens shown in FIGS. 12 and 13 and the screen shown in FIG. 14. Also, unlimited to the form for creating and displaying the route lines as in FIG. 12 and FIG. 13, the information selection screen shown in FIG. 14 may display the region information that is unrelated to the tourist routes but related to objects shown on the screen using AR (augmented Reality), for example.

Each of the simplified display sections 41*a* to 41*d* includes an introduction image section 42, a title display section 43, a duration display section 44, and a user display section 45 for displaying a person posted the region information. If the person posted the information has a rank, such as "professional" or "semi-professional", such rank is displayed next to the user display section 45. Touching operation etc. on each of the simplified display sections 41a to 41d selects the region information and changes the screen to the region information detail screen, which will be described below.

Figure 15:
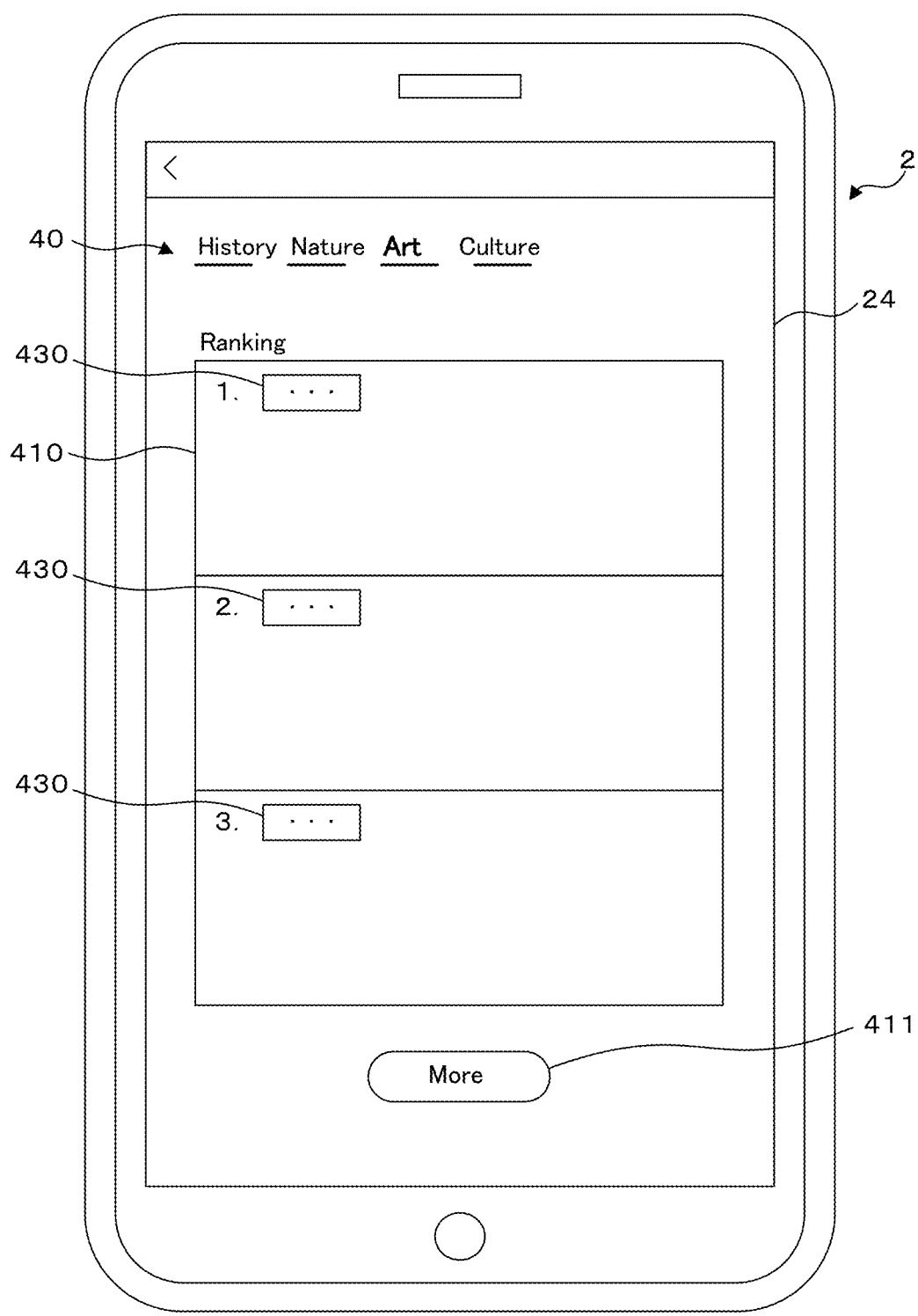
FIG. 15 is a view illustrating an example of the information selection screen in accordance with the present disclosure.

The information selection screen may also be in other forms. For example, the display of the region information includes displaying a collection of the region information as well as directly displaying the region information. As an example form of displaying the collection of the region information, the region information may be ranked and the region information may display a list of ranking of the region information. FIG. 15 is an illustration showing an example of the information selection screen. The information selection screen as shown in FIG. 15 includes the category display section 40 as in FIGS. 12 and 13, and a ranking display section 410. In FIG. 15, the ranking display section 410 displays the first to third ranked region information, and a title display section 430 displays a title of the region information. The ranking display section 410 may also include information related to the region affiliated person who posted each ranked region information, the duration of the region information, and so on. The information selection screen also includes a display button 411 for displaying more region information that are ranked lower. By touching etc., the display button 411, the user can see the region information that is ranked fourth or lower.

The information selection screen may be in a form in which the user can select from a plurality of the forms shown in FIGS. 12 and 15 by an operation such as touching or swiping, or the information selection screen may display only one of the forms, unrelated to the user's selection. Also, the information selection screen may be in other forms than those shown in FIGS. 12 to 15.

Then, the control unit 21 checks whether the region information is selected or not (S7). If the region information is not selected (S7: NO), the control unit 21 returns the process to the step S7. If the region information is selected (S7: YES), the control unit 21 displays the region information detail screen (S8).

Figure 16:
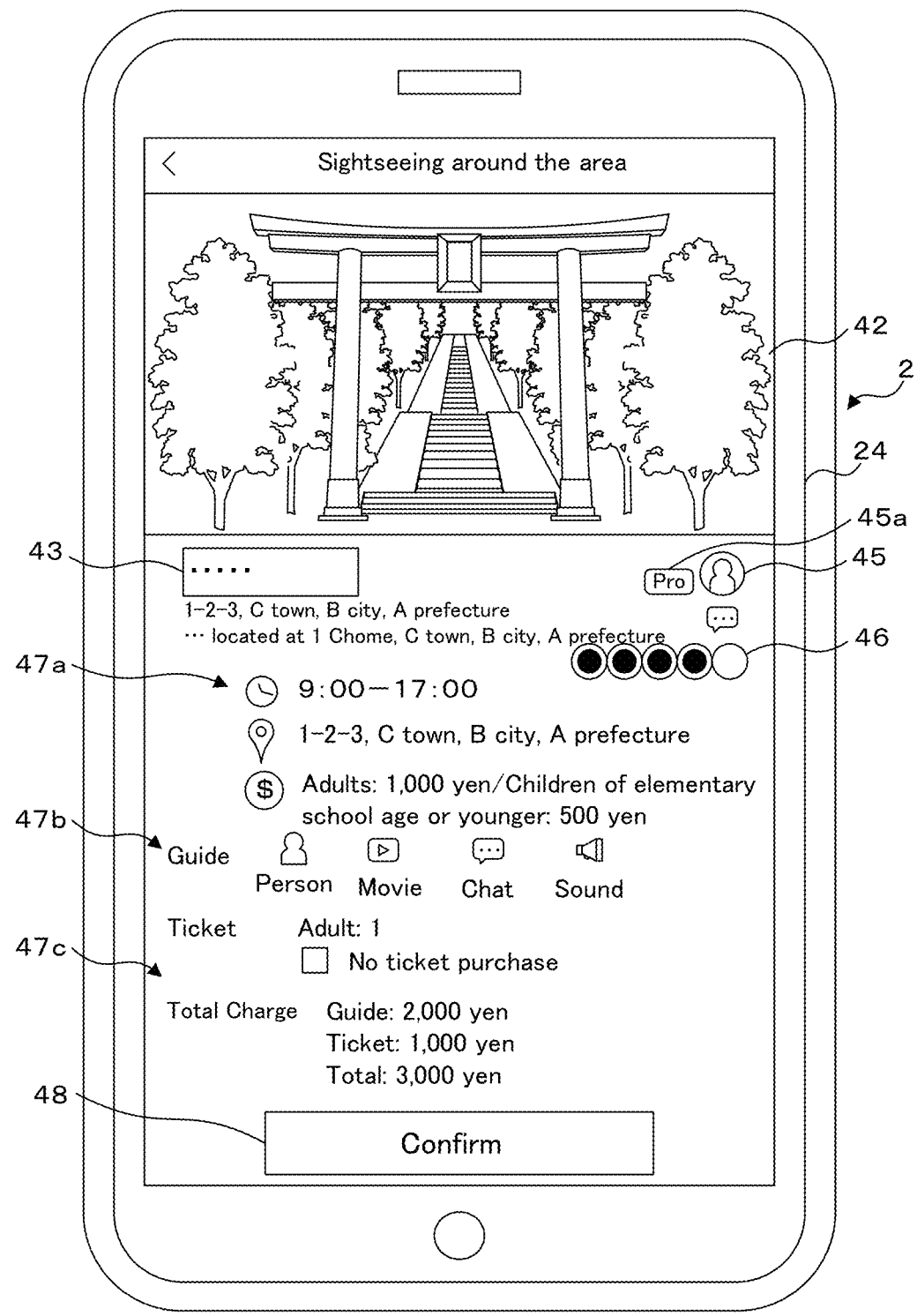
FIG. 16 is a view illustrating an example of a detailed region information screen in accordance with the present disclosure.

FIG. 16 is an illustration showing an example of the region information detail screen. The region information detail screen displays the introduction image section 42 as in FIG. 14, and underneath the introduction image section 42, the title display section 43, the user display section 45, and a rank display section 45a are displayed. Furthermore, a review display section 46, a detail information display section 47a, a type selection section 47b, and a charge display section 47c, and a confirmation button 48 are also provided. The review display section 46 displays a review of the region information. The detail information display section 47a displays detail information including locations and opening hours of tourist spots related to the region information. The type selection section 47b is for selecting a type of the guide. The charge display section 47c displays charges for using the region information, entrance fees for facilities including art galleries and museums, a selection icon to select whether to pay for the charges or fees, and the like. The confirmation button 48 is for confirmation of the content. Here, forms that can be selected in the type selection section 47b may include a tour-guide person (a "person" icon in the drawing), a video guide (a "video" icon in the drawing), a chat guide (a "chat" icon in the drawing), an audio guide (an "audio" icon in the drawing), and so on. The icon for the tour guided by the tour-guide person accepts a reservation of actual tours guided by the tour-guide person at the site. The user can select the guide type in the type selection section 47b and confirm the use of the selected region information by touching or the like the confirmation button 48, also settling the payment for the charges and the fees.

Figure 17:
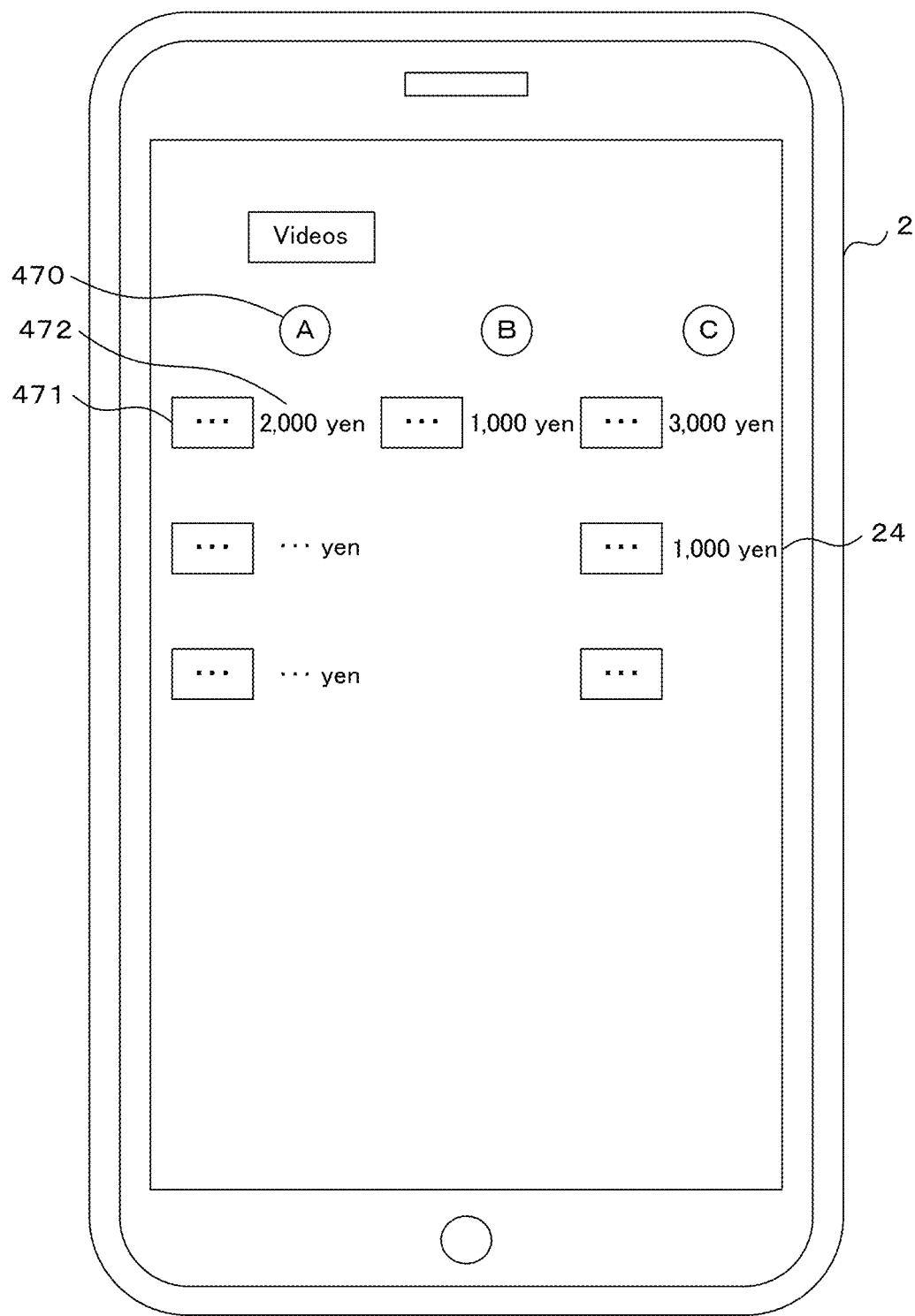
FIG. 17 is a view illustrating an example of a video list display screen in accordance with the present disclosure.

If the "video" icon is selected by touching operation or the like, a list of the tour-guide persons who posted the video, and the videos posted by each tour-guide person may be displayed. FIG. 17 is an illustration showing an example of a video list display screen. As shown in FIG. 17, the video list display screen includes a name display section 470 for showing names of the tour-guide persons who posted the videos ("A", "B", and "C" in the drawing), a title display section 471 for showing titles of the videos posted by the tour-guide persons, and a charge display section 472 for showing a charge for watching the video.

When the video guide is selected, the video may start playing from a starting point that is linked to the location information. In such the case, the terminal 2 starts playing the video based on video information retrieved from the video information DB 143 in the server 1. For example, if the video to be played includes a tour of a plurality of spots, then the video may start playing from a part corresponding to a spot that is closest to a location according to the location information. Also, if there is a video for each of the spots, the video corresponding to the spot that is closest to the location according to the location information may be played. As shown in FIG. 5, the location information and the starting time of the video are linked in the video information. The location information and the starting time of the video are linked when the region affiliated person shoots the video for posting, for example.

The control unit 21 checks whether the selection of region information is confirmed by an operation such as pressing on the confirmation button 48 on the region information detail screen or not (S9). If the region information is not confirmed (S9: NO), the control unit 21 returns the process back to the step S9. If the region information is confirmed (S9: YES), the control unit 21 outputs and sends settlement information to the server (S10), and terminates the starting process of the guided tour. If the starting process of the guided tour is terminated, a guide based on the region information begins.

Figure 18:
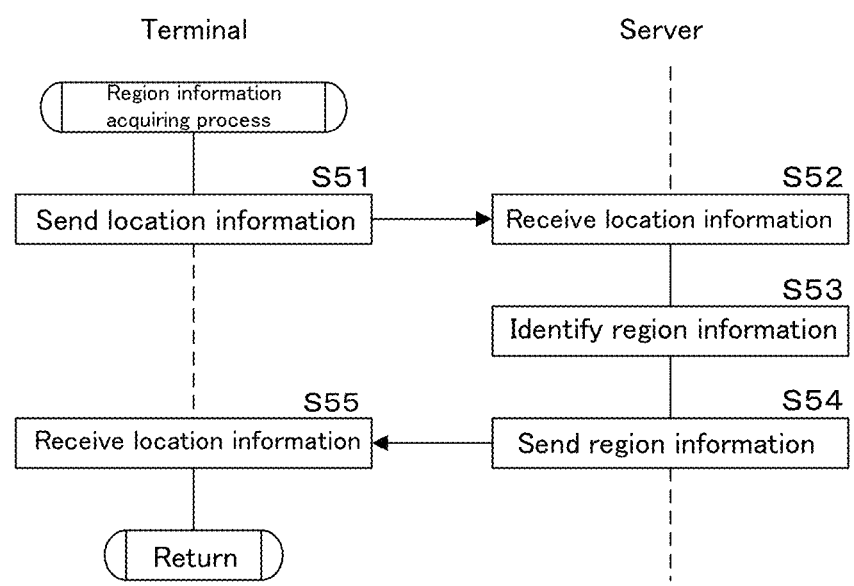
FIG. 18 is a flowchart showing a procedure of a region information acquiring process in accordance with the present disclosure.

FIG. 18 is a flowchart showing a procedure of a region information acquiring process. In the region information acquiring process, the control unit 21 sends the location information based on the information that the user inputs on the terminal 2 (S51). The server 1 receives the location information (S52), and the control unit 11 refers to the region information DB 141, the route information DB 142, the video information DB 143, and the spot information DB 144 to identify the region information corresponding to the received location information (S53). The control unit 11 sends the identified region information to the terminal 2 (S54). The terminal 2 acquires the region information (S55) and terminates the region information acquiring process.

Figure 19:
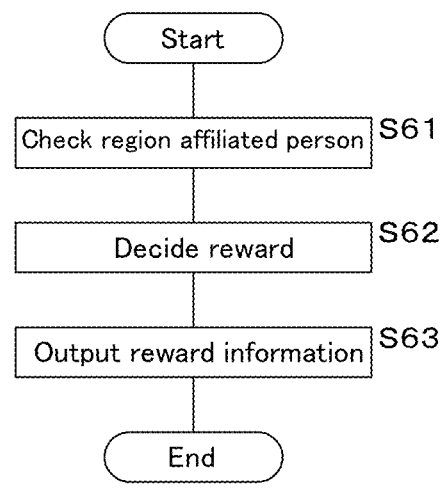
FIG. 19 is a flowchart showing a procedure of a reward-granting process in accordance with the present disclosure.

If the communication unit 13 receives the settlement information sent from the terminal 2, the control unit 11 of the server 1 carries out a reward-granting process. FIG. 19 is a flowchart showing a procedure of the reward-granting process. The control unit 11 refers to the region information DB 141 to check the region affiliated person who posted the region information relevant to the settlement information (S61). The control unit 11 decides a reward based on the settlement information (S62). The reward may be decided by using a ratio or the like that is set in advance for the fees for using the region information, for example. Then, the control unit 11 outputs the information relevant to the reward to a bank system etc., of which the region affiliated person owns a bank account. This allows paying the reward to the region affiliated person for his/her posted region information. If entrance fees etc. are settled at the same time, the control unit 11 also sends information relevant to the entrance fees etc. to the bank system of which the recipients of the fees own the bank accounts.

Figure 20:
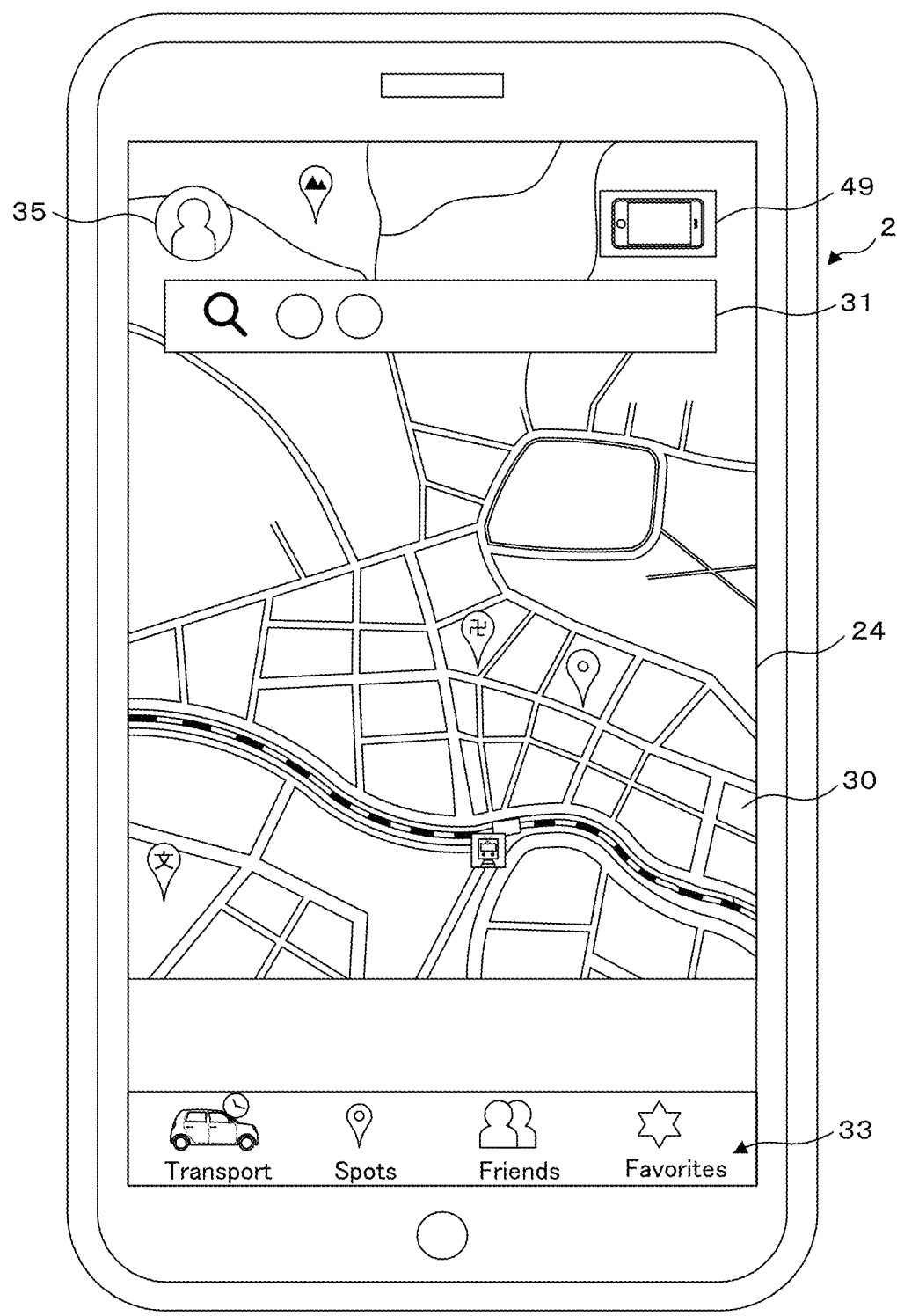
FIG. 20 is a view illustrating an example of an AR switching screen in accordance with the present disclosure.

When the above starting process of the guided tour terminates, the control unit 21 then starts the tour guide based on the region information. At the beginning of the guide, a video relevant to the region information may be played, for example. The guide may be displayed using AR. This can provide the region information more satisfactorily. In such the case, an AR switch icon may be displayed on a screen of the terminal 2. FIG. 20 is an illustration showing an example of an AR switching screen. As shown in FIG. 20, an AR switch icon 49 is shown over the map section 30, for example. By touching the AR switch icon 49, the screen can alternate between a usual mode and an AR mode.

Figure 21:
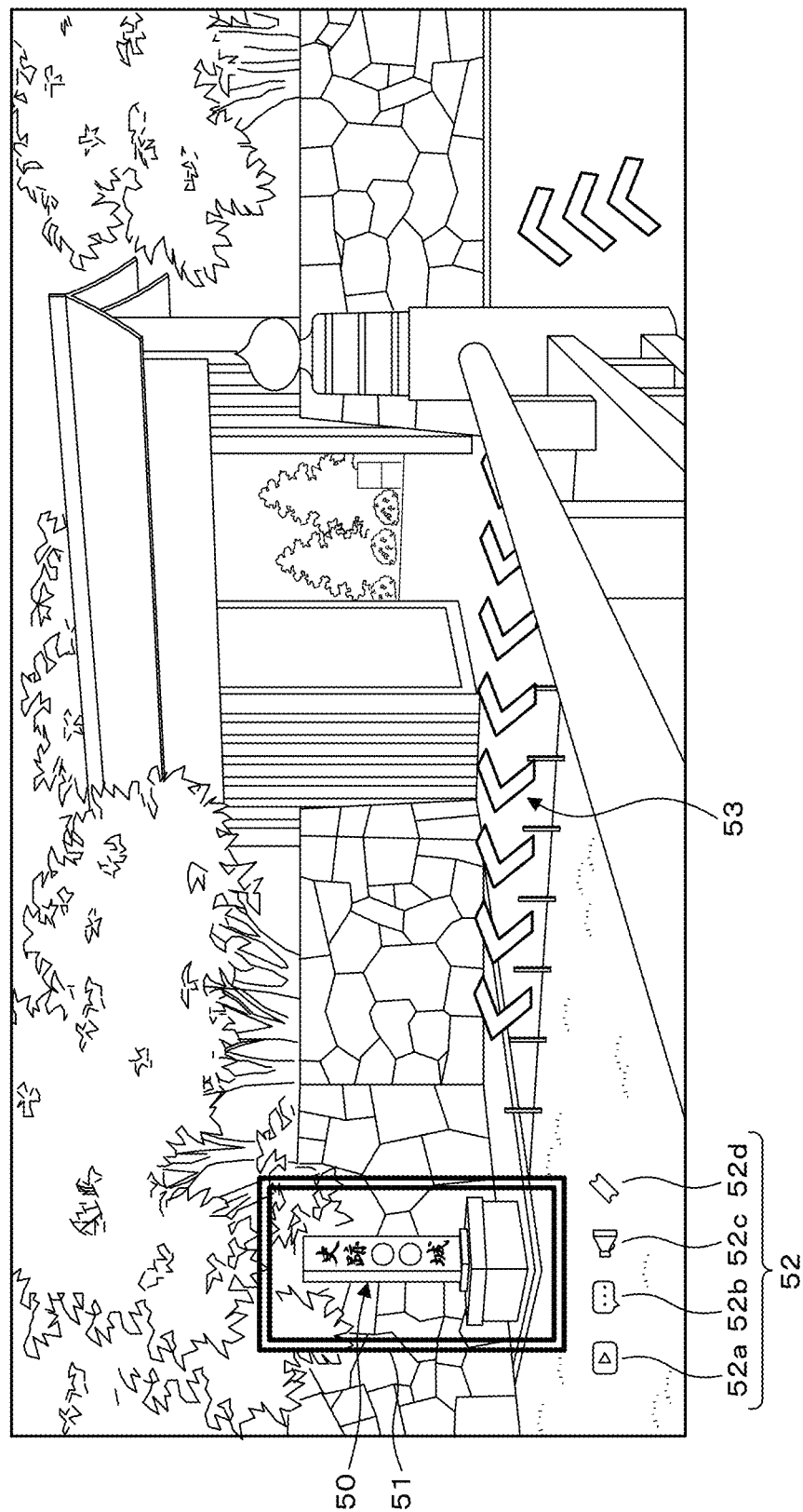
FIG. 21 is a view illustrating an example of a guided tour screen in accordance with the present disclosure.

FIG. 21 is an illustration showing an example of a guide screen. The guide screen shown in FIG. 21 shows a guide screen using AR. In FIG. 21, a real object 50, which is an object for the guided tour, is displayed through the image capturing unit 27 on the display section 24. A frame section 51, a function icon section 52, and an arrow 53 are displayed over the image shown through a camera. The frame section 51 surrounds the object 50, the function icon section 52 located under the frame section 51 includes various functions, and the arrow 53 shows a route from a current location to the object 50. The object 50 is a spot or the like registered in the server 1 in advance.

The function icon section 52 includes a region information selection icon 52*a*, a description display icon 52*b*, an audio guide icon 52*c*, and a charge icon 52*d*. When the region information selection icon 52*a* is selected by a touch operation or the like, the screen changes to following information selection screens (see FIG. 23 and FIG. 24). When the description display icon 52*b* is selected, descriptions of the object 50 are shown as texts, for example, on the AR screen. The descriptions may be set in advance, or may be posted by the region affiliated persons. Furthermore, the region affiliated persons may add, alter, or remove the descriptions at any time, and the description may be a comment about a part of the object. Here, for adding the description, the user may touch and select a part of the object on the AR screen, to which the user wishes to add the description, and enter its description. This can link the part of the object to the description. Also, the description may be able to include more useful information if the region affiliated person can add the descriptions to the object in the guide based on the region information.

In the guide screen, for example, the user may post pictures or videos of the place relevant to the same object 50 that are taken at different times and under different weather conditions, such as during daytime, nighttime, on a fine day or cloudy day. Such images are displayed according to the information relevant to the spot information DB 144 of the server 1. Also, the user may view through such posted images by swiping operation or the like, for example.

Selecting the audio guide icon 52*c* plays an audio describing the object. Selecting the charge icon 52*d* shows usage charges or fess for admission of the object, if any, and accepts settlement for such payment, for example.

Figure 22:
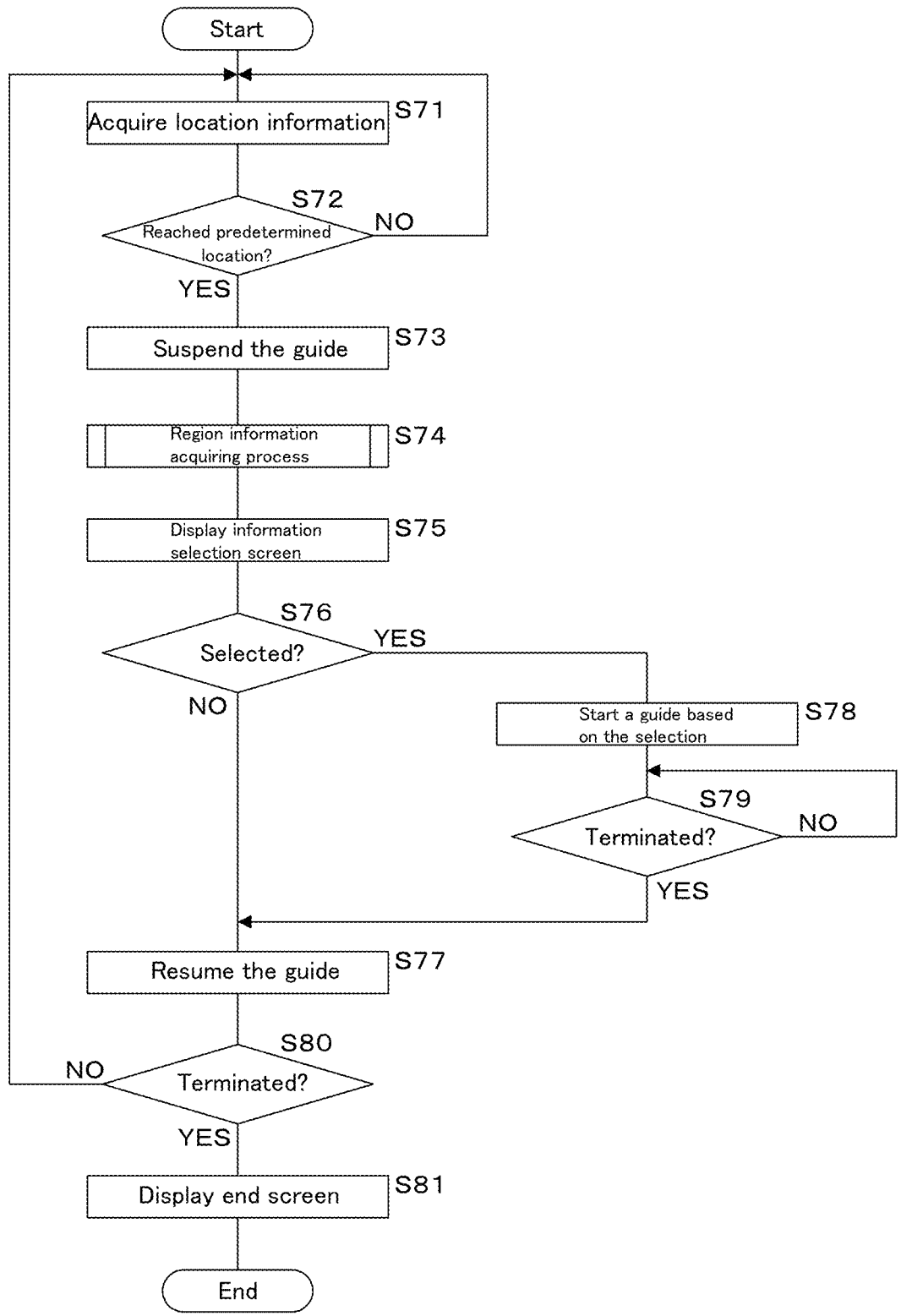
FIG. 22 is a flowchart showing a procedure of a guide process in accordance with the present disclosure.

While conducting the guide based on the region information by playing the video or the like, the control unit 21 executes a following guide process. FIG. 22 is a flowchart showing a procedure of the guide process. The control unit 21 acquires the location information using the position detector 28 of the terminal 2 (S71). The control unit 21 checks if the acquired location information has reached at a predetermined location or not (S72). This is to decide if the user has arrived at the predetermined location or not. If it is decided that the user has not arrived at the predetermined location (S72: NO), the control unit 21 returns the process back to the step S71.

If it is decided that the user has arrived at the predetermined location (S72: YES), the control unit 21 suspends the guide (S73). The suspension of the guide means a pause in the video play, for example. Then, the control unit 21 executes the above-mentioned region information acquiring process based on the location information of the predetermined location (S74) and displays the acquired information selection screen (S75). At this time, the region information acquiring process may be executed after the selection is made by the touching operation or the like on the above-mentioned region information selection icon 52*a*.

Figure 23:
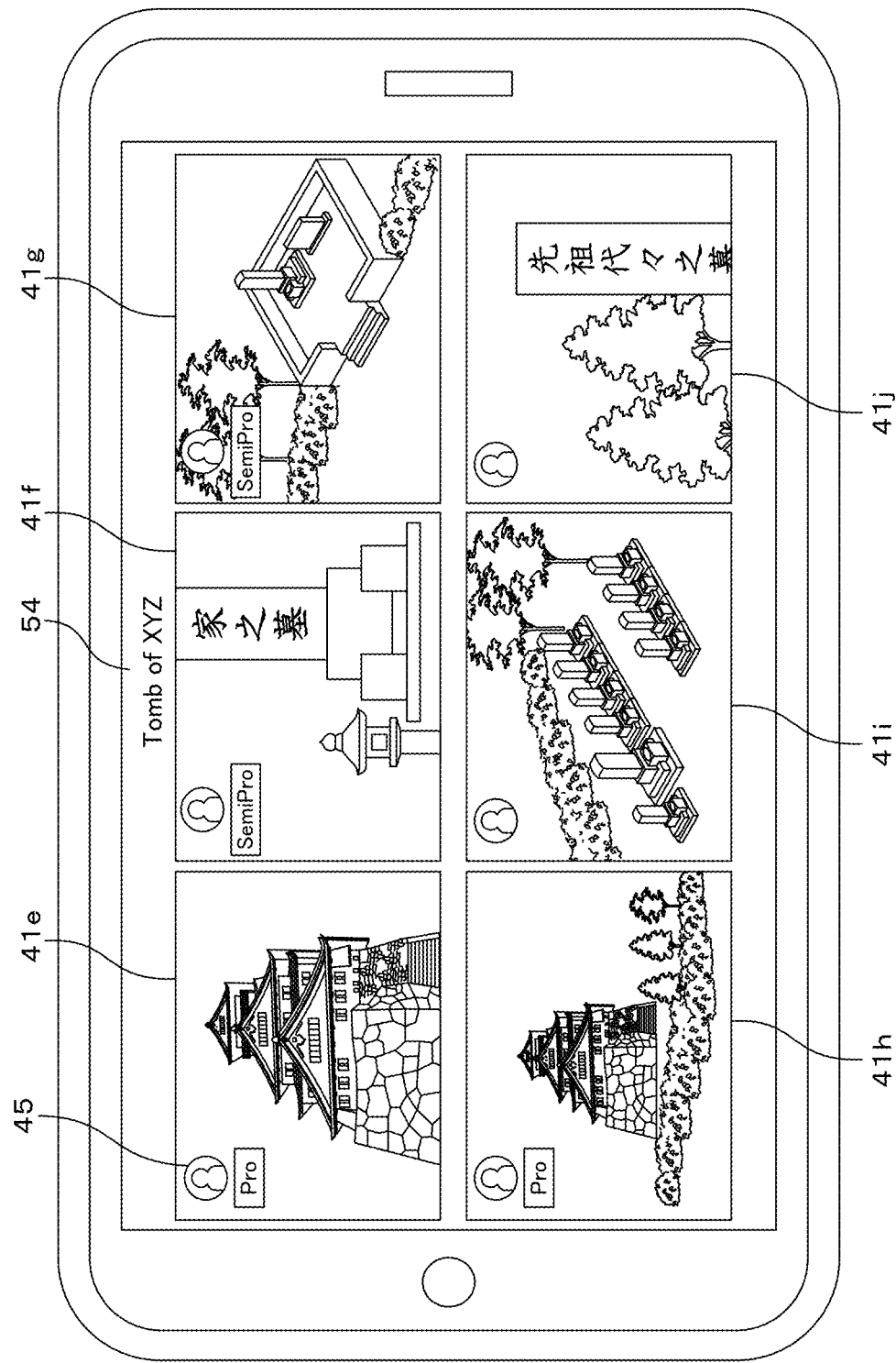
FIG. 23 is a view illustrating an example of the information selection screen in accordance with the present disclosure.
Figure 24:
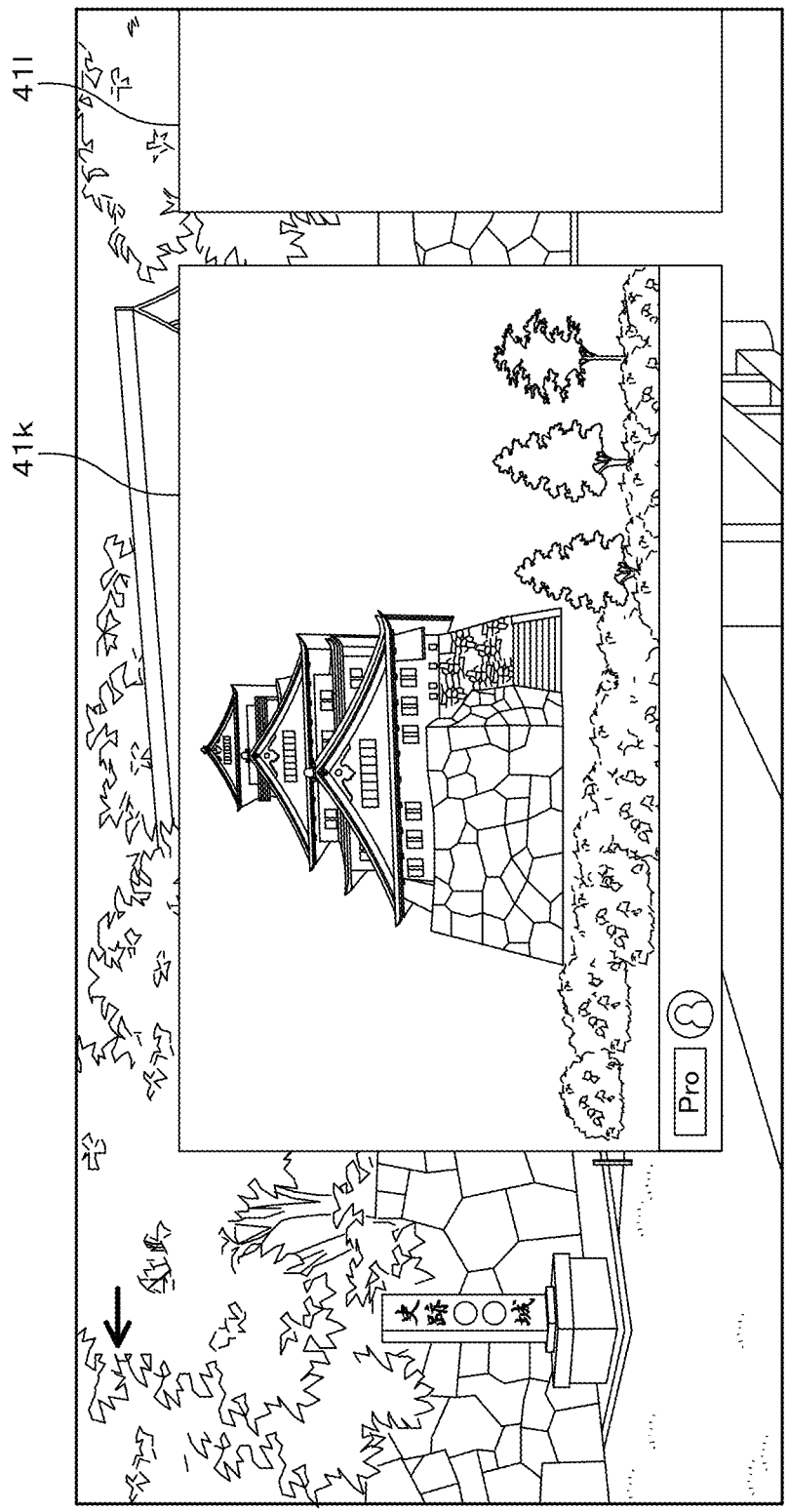
FIG. 24 is a view illustrating an example of the information selection screen in accordance with the present disclosure.

FIG. 23 and FIG. 24 are illustrations showing examples of the information selection screen. The control unit 21 displays simplified display sections 41*e* to 41*j* and a title 54. The simplified display sections 41*e* to 41*j* are still images or the like for briefly displaying each region information based on the acquired region information. The title 54 is a name or the like of the object 50 at the predetermined location. The each of the simplified display sections includes the user display section 45, which shows a profile picture of the region affiliated person who posted the information, and his/her rank, if the person has any.

Also, the region information selection screen in FIG. 24 shows an enlarged simplified display section 41*k*. A swiping operation from left to right, for example, may display other simplified display sections one after another. The user may select and switch between the region information selection screens in FIG. 23 and FIG. 24 by pressing a button, which is omitted in the drawing, for example.

Touching operation or the like on the simplified display sections on the information selection screens shown in FIG. 23 and FIG. 24 selects the region information, and a vertical swiping operation may cancel the selection, for example.

The control unit 21 then checks if the region information is selected or not (S76). If the region information is not selected (S76: NO), the control unit 21 resumes the suspended guide (S77). If the region information is selected (S76: YES), a guide starts based on the selected region information (S78). The control unit 21 checks if the newly started guide is terminated or not (S79). Here, the termination of the guide includes a termination of the guide program of the region information as well as a termination due to a forced termination button.

If the guide is not terminated (S79: NO), the control unit 21 returns the process back to the step S79. If the guide is terminated (S79: YES), the control unit 21 moves the process to the step S77.

After resuming the guide, the control unit 21 checks if the guide is terminated or not (S80). Here, similar to the above, the termination of the guide includes the termination of the guide program of the region information as well as the termination due to a forced termination button.

If the guide is not terminated (S80: NO), the control unit 21 returns the process back to the step S71. If the guide is terminated (S80: YES), the control unit 21 displays an end screen (S81) and terminates the process. Here, the end screen accepts reviews of the region affiliated person or the region information, and comments on the region information. This can provide the users' reviews of the region affiliated persons or the region information.

Figure 25:
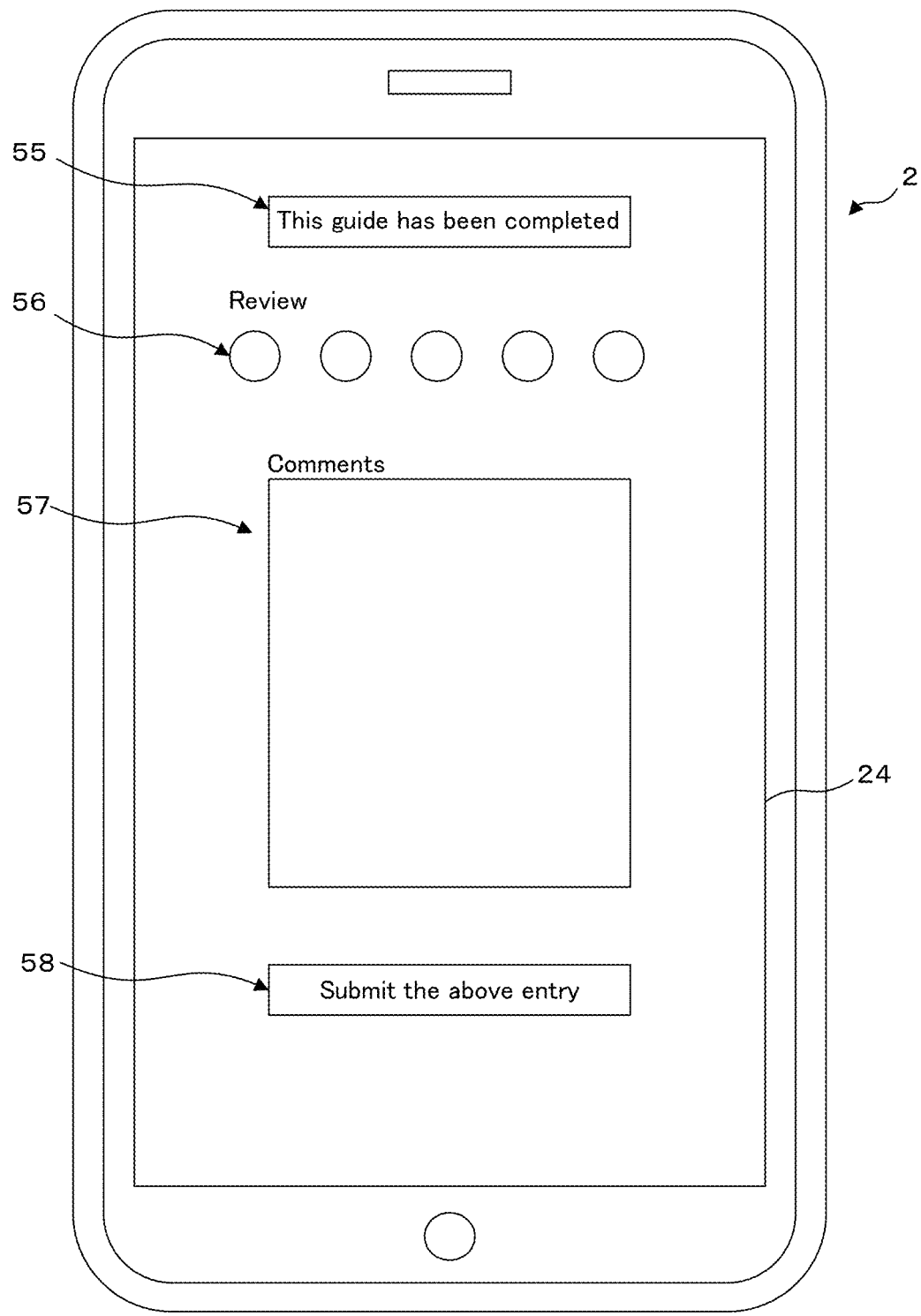
FIG. 25 is a view illustrating an example of an end screen in accordance with the present disclosure.

FIG. 25 is an illustration of an example of the end screen. As shown in FIG. 25, the end screen may display an end notification 55, a review entry space 56, a comment entry space 57, and a send button 58. The review entry space 56 may be in a form of a five-rank gauge, where the user may give five-rank evaluation by filling the gauge by touching operation or the like. Touching the send button 58 can enter and send the review and the comment to the server 1.

Figure 26:
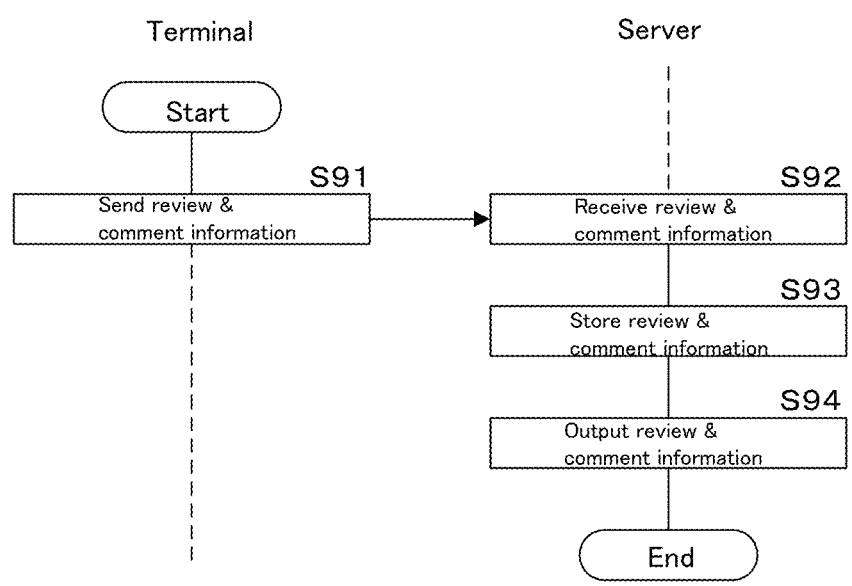
FIG. 26 is a flowchart showing a procedure of a review and comment accepting process in accordance with the present disclosure.

When the send button 58 is pressed in the above end screen or the like, the terminal 2 and the server 1 execute a review and comment accepting process. FIG. 26 is a flowchart showing a procedure of the review and comment accepting process. The terminal 2 sends review and comment information according to the review and comment entered (S91). The server 1 receives the review and comment information sent from the terminal 2 (S92), links the review and comment information to the region information, and stores the information in the region information DB141 (S93). The control unit 11 of the server 1 outputs the review and comment information to a personal computer connected to the server 1, for example (S94). This can notify a manager or the like of the server 1 on the screen of the personal computer. The manager can then handle the information, or even remove the information if the region information mimicking the other region information or false region information is posted.

For the above-mentioned ranks, the manager of the server 1 may set the "professional" in advance, and the "semi-professional" may be given to a user approved as a local member. Here, the local member may be automatically determined by the server 1: the server 1 acquires the number of times that the location information of the user is detected using the position detector 28 of the terminal 2 at specific places such as railway stations or tourist spots, and the server 1 determines based on the acquired information and the contents of the level information DB 145. The local member may also be designated based on a location of the school to which the user went, the information which is publicized in the user's SNS account, for example. Also, a level of relevance to the region may be set based on the detected number of times of the location information. The level may be in ten grades, for example, and the members having the higher grades may be given priorities in displaying order of the posted region information. Also, the level may be raised according to the number of the detected location information, rewards, SNS profile information, and the users' reviews. For example, raising the level according to the rewards includes a case where the level is raised because of a large amount of one time reward (including a case where the level is raised remarkably if the amount of the one-time reward is large), a case where the level is raised because of a large amount of the total rewards, and a case where the level is raised because of a large number of times of getting the rewards. Also, the level may be raised according to the reviews of the contents of the guide information (including the user's reviews and automatic machine reviews).

Figure 27:
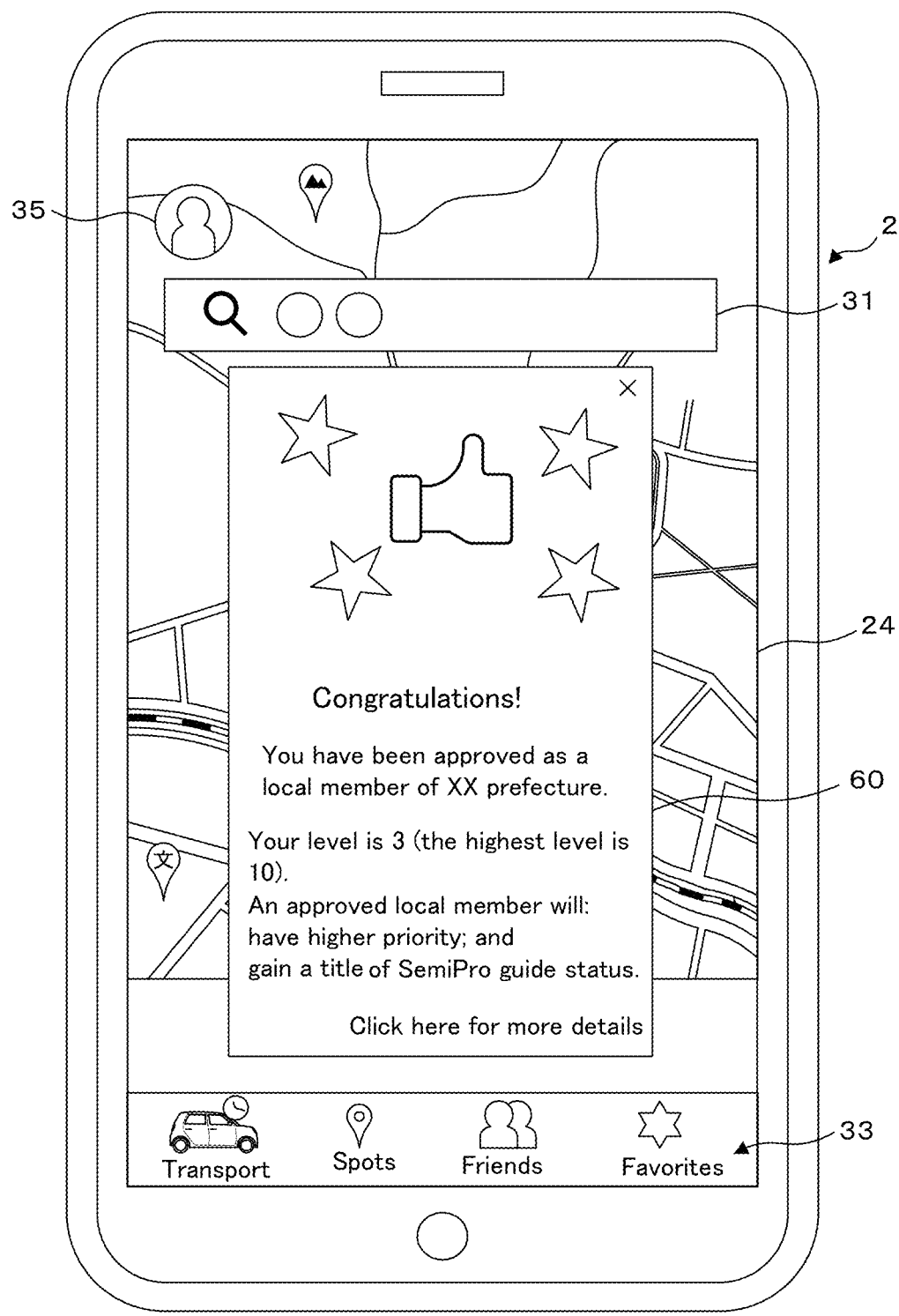
FIG. 27 is a view illustrating an example of a local member approval screen in accordance with the present disclosure.

FIG. 27 is a view illustrating an example of a local member approval screen. When the user is approved as the local member, as shown in FIG. 27, a notification screen 60 displays a notification that the user is approved as the local member of the region, the user's level, and advantages for being approved as the local member.

According to the above embodiment, the region information is posted by the region affiliated persons, and a wide range of the various region information posted by the region affiliated persons can be displayed based on the location information. Thus, the users can be provided with the wide range of the region information. The tour-guide persons can provide the region information they own as the region affiliated persons, and conduct the tours without actually being present in the region relevant to the region information. The region affiliated persons or the region information can be displayed along with the users' reviews, and this can be used as a guideline for the user using the region information.

Also, the location information is acquired continuously during the guide process. This can provide the user another region information relevant to the location that is to be reached while receiving the guide based on the region information. The first embodiment displays the charges relevant to the guide based on the region information, and accepts the settlement of such charges. Also, when admission fees occur during the guide, such fees can be settled together with the region information usage charges, which improves convenience.

When a place name or the like is entered into the input box 31, the change in the location information is accepted. If the change is accepted, the region information posted by the region affiliated person corresponding to the new location information is to be displayed. Thus, when the user using the region information moves, the region information of the new place can be provided.

Second Embodiment

In a second embodiment of the present disclosure, the procedure of the region information acquiring process is different. The same notations as in the first embodiment will be given to the same structures of the information processing system according to the second embodiment, and redundant descriptions will be omitted.

Figure 28:
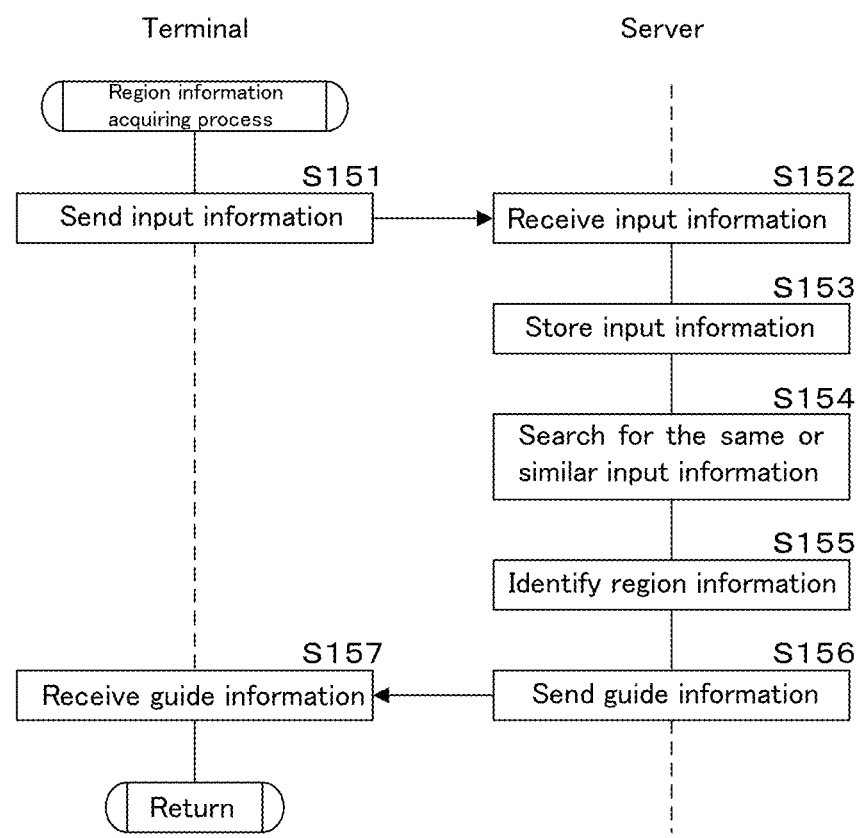
FIG. 28 is a flowchart showing a procedure of a region information acquiring process in a second embodiment in accordance with the present disclosure.

FIG. 28 is a flowchart showing the procedure of the region information acquiring process in the second embodiment. The control unit 21 of the terminal 2 sends information entered on the detail input screen in the first embodiment (see FIG. 10) to the server 1 (S151). Here, on the detail input screen, the user may be able to enter requests, such as "tour of art galleries" or "eating delicious food". The user's request may be entered simply by keywords. Thus, the input information includes the date, time zone, requests, and so on. The input information may be entered by automatic information acquisition, in which the control unit 21 follows the program P2 to retrieve data from the e-mail or the like that includes information of the itinerary arranged by the travel agency.

The server 1 receives the input information sent from the terminal 2 (S152) and stores the received input information in the memory unit 12 (S153). Then the control unit 11 of the server 1 refers to the input information stored in the memory unit 12 and checks if there is the input information that is the same as or similar to the information received this time (S154). Here, the same or similar input information includes the information having the same date or the request etc.

The control unit 11 of the server 1 identifies the region information by referring to the region information DB 141 (S155), and sends guide information including the region information (S156). Here, if there is the same or similar input information found, the control unit 11 sends, in addition to the identified region information, the guide information including the date, request, information on sender of the input information relevant to the same or similar input information. Each user may be able to decide whether to store the input information in the server 1 or not.

If the same or similar input information is not found, the control unit 11 sends the identified region information as the guide information. Then, the control unit 21 of the terminal 2 receives the guide information sent from the server 1 (S157) and terminates the process.

The above embodiment can provide the same region information to the plurality of users who have the same requests on the region information. Also, the user receiving the guide information can share the same region information with the other user having the same or similar requests etc., and they may be able to travel together.

The guide information may be determined by using AI (Artificial Intelligence). A neural network model including deep learning may be used as a learning model. For example, if the user sends a message of a request as the input information (such as "I want to go to an art gallery.") using the message sending function in FIG. 33 (see below) and the other local user sends a message (e.g. "I recommend the art gallery A.") in response to the input information, such correspondence may be learned by the learning model so that the learning model can learn the guide information corresponding to the input information. In such the case, the learning model is stored in the memory unit 12 of the server 1 and used as a program module of AI software. The control unit 11 using a CPU, GPU, or quantum computer, performs an estimation process in accordance with the learning model stored in the memory unit 12. The learning model is prepared for each region. The control unit 11 reads out the learning model that corresponds to the acquired location information to process the estimation. For example, after a morphological analysis, names of destinations, such as art galleries, restaurants, and temples, or nouns such as meals, sports, and movies, which are included in the user's request, may be input into an input layer. In addition to the user's request, the location information (e.g., latitude and longitude, names of city, town, village, etc.) of the area covered by the region information DB 141 may also be input into the input layer. Furthermore, in addition to the user's request, an attribute of the user (e.g., sex, tastes) may be input into the input layer. A plurality of candidate locations stored in the region information DB 141 are set for the output layer. For example, the output layer uses the Softmax function, and outputs in the end probabilities for an art gallery A, a restaurant B, a temple C, and so on. The region information DB 141 stores a history of the large number of the destinations suggested by the local residents or the tour-guide persons in response to the user's request, attribute, and the location information. The learning model learns a plurality of sets of such combinations as training data. The control unit 11 learns parameters for a middle layer of the learning model using an error back propagation method or the like. Although the present embodiment shows an example in which the server 1 stores the learning model, the memory unit 22 of the terminal 2 may store the learning model and make the estimation. Also, the learning model can relearn a usage history of the user who received the guide information (e.g., whether the user actually went to the art gallery A when the user received the information "I recommend the art gallery A." or not.) This enables the AI to estimate the guide information more appropriately in response to the user's request. Here, the usage history of the user includes the input information such as the user's request input on the detail input screen, the region information used, or the user's review of the recommendation. If the user actually visited the recommended destination or gave a high review to the recommendation, then the control unit 11 let the learning model to add a set or a plurality of extra sets of the user's request and attribute, the location information, and suggested destinations to the training data for relearning. Also, the present system may be configured so that messages can be sent between the users and the user's usage history may include contents of such messages. By using the learning model that has learned the guide information in response to the user's input information and the usage history in response to the user's guide information, the appropriate guide information in response to the user's request can be estimated, and the control unit 11 sends the estimated guide information to the user's terminal 2.

The learning model may be a recurrent neural network (RNN). If an RNN is used, the plurality of the destinations that the user visited in the past and the accepted requests are input as time-series data into the input layer of the learning model. For example, if the destinations of an art gallery A, a museum B, and a restaurant C are input chronologically, followed by a request "I want to go to a cultural facility", then the learning model takes the past history into consideration and suggests a modern art gallery D, which is different from, but highly-related to, the art gallery A and the museum B. In addition to the request data, the location information of the terminal 2 at the time of the request or the attribute of the terminal 2 user may be input as well. Also, the memory unit 12 stores the time-series data including the plurality of the past destinations and the requests and the history of the large number of the destinations suggested by the local residents or the tour-guide persons. The learning model learns the plurality of sets of such combinations as training data. The control unit 11 learns parameters for a middle layer of the learning model using an error back propagation method or the like. The learning model is not limited to the neural network model and may be other machine learning model. The followings are supplementary notes.

(Supplementary Note 1) A program to be executed by a computer for processes of acquiring location information, upon accepting an input of a request for a suggestion of region information, reading a learning model corresponding to the acquired region information out of a plurality of learning models learned for the each region to output region information recommended by the region affiliated persons, inputting the retrieved request into the learning model, and outputting the recommended region information.

(Supplementary Note 2) The program according to the supplementary note 1, wherein the learning model learns using training data including, in addition to the request, the requested user's location information, attribute, and the region information recommended by the region affiliated person, the program further including processes of inputting the requested user's location information and attribute in addition to the retrieved request into the learning model, and outputting the recommended region information.

(Supplementary Note 3) The program according to either of the supplementary notes 1 or 2, wherein the learning model learns using time-series data including a plurality of the requested user's past visited locations and the requests and the training data including the region information recommended by the region affiliated person, the program further including processes of inputting the retrieved time-series data including the plurality of the requested user's past visited locations and the requests into the learning model, and outputting the recommended region information.

Third Embodiment

In a third embodiment of the present disclosure, a case in which the item button "Friends" is selected on the starting screen will be described. The same notations as in the first embodiment will be given to the same structures of the information processing system according to the third embodiment, and redundant descriptions will be omitted.

Figure 29:
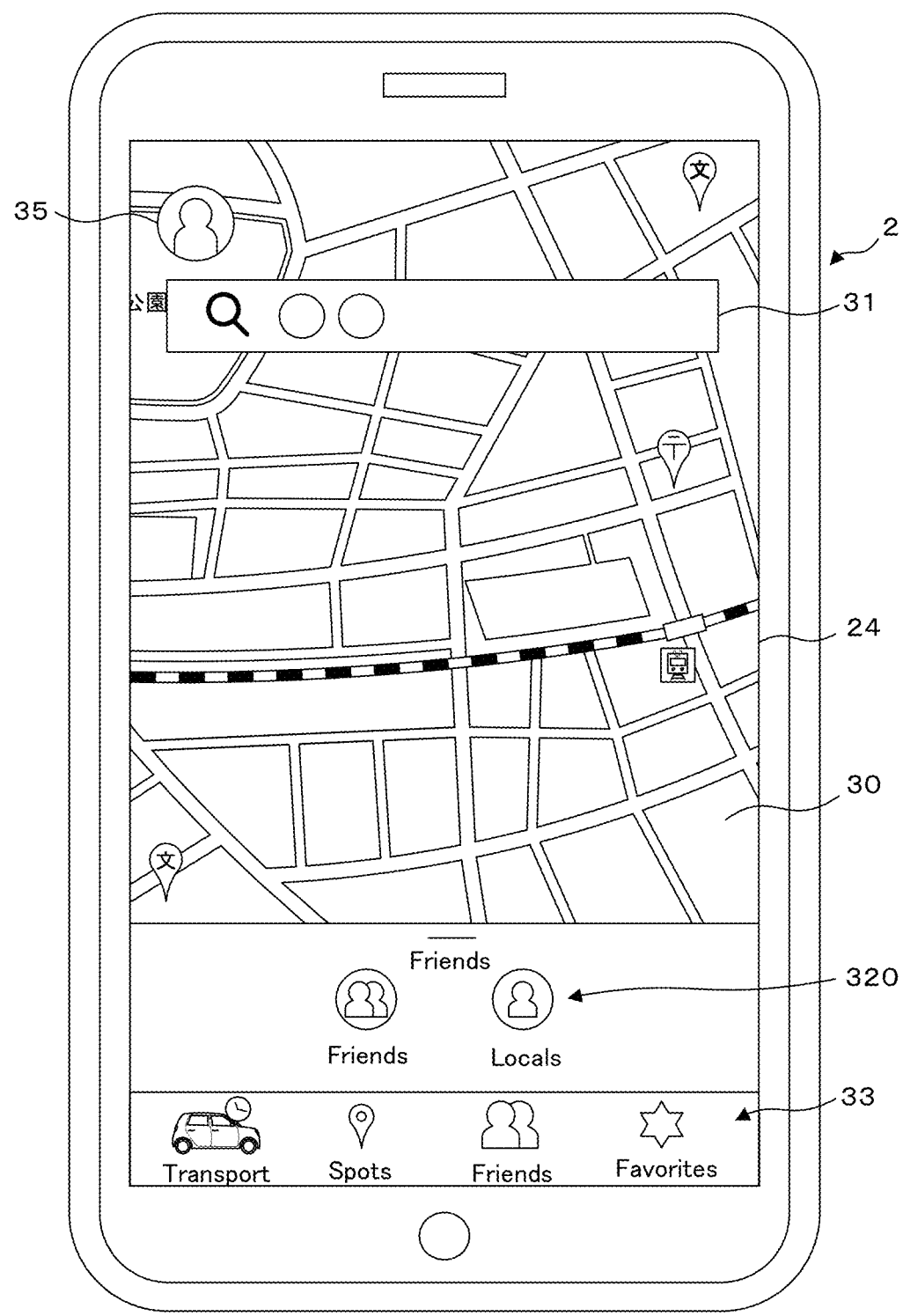
FIG. 29 is a view illustrating an example of a friend and local member selection screen in a third embodiment in accordance with the present disclosure.

FIG. 29 is a view illustrating an example of a friend and local member selection screen in a third embodiment. When the "Friends" item is selected in the item selection section 33 on the starting screen (see FIG. 10), the friend and local member selection screen shown in FIG. 29, for example, is displayed. As shown in FIG. 29, the friend and local member selection screen displays the map section 30, the input box 31, the item selection section 33, and the user display section 35. The friend and local member selection screen also displays a purpose selection section 320 for selecting either a friend or a local member. The purpose selection section includes a selection button for each "Friends" and "Locals". When the "Friends" item is selected, the screen changes to a friend selection screen. When the "Locals" item is selected, the screen changes to a local member selection screen.

Figure 30:
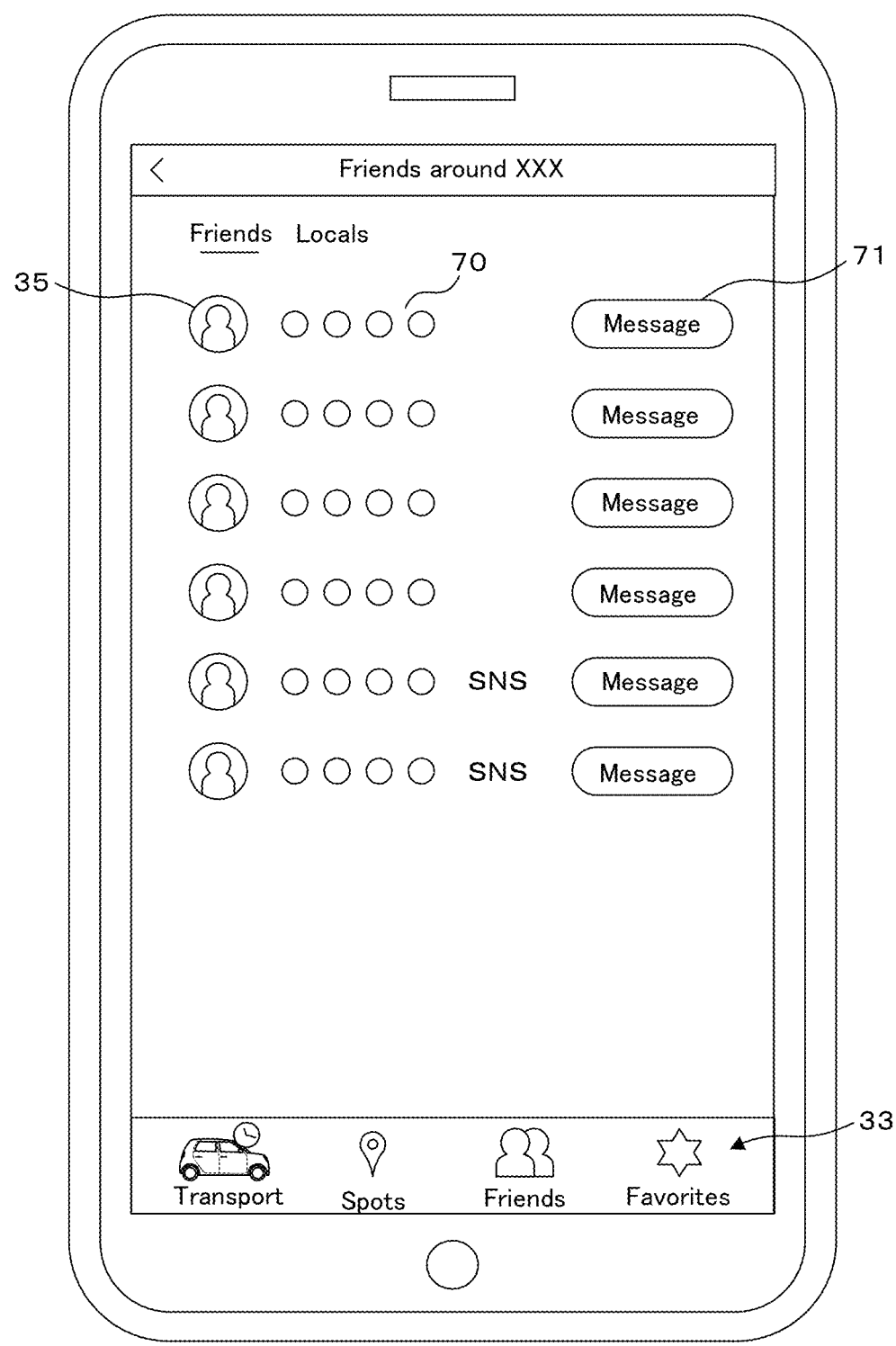
FIG. 30 is a view illustrating an example of a friend selection screen in accordance with the present disclosure.
Figure 32:
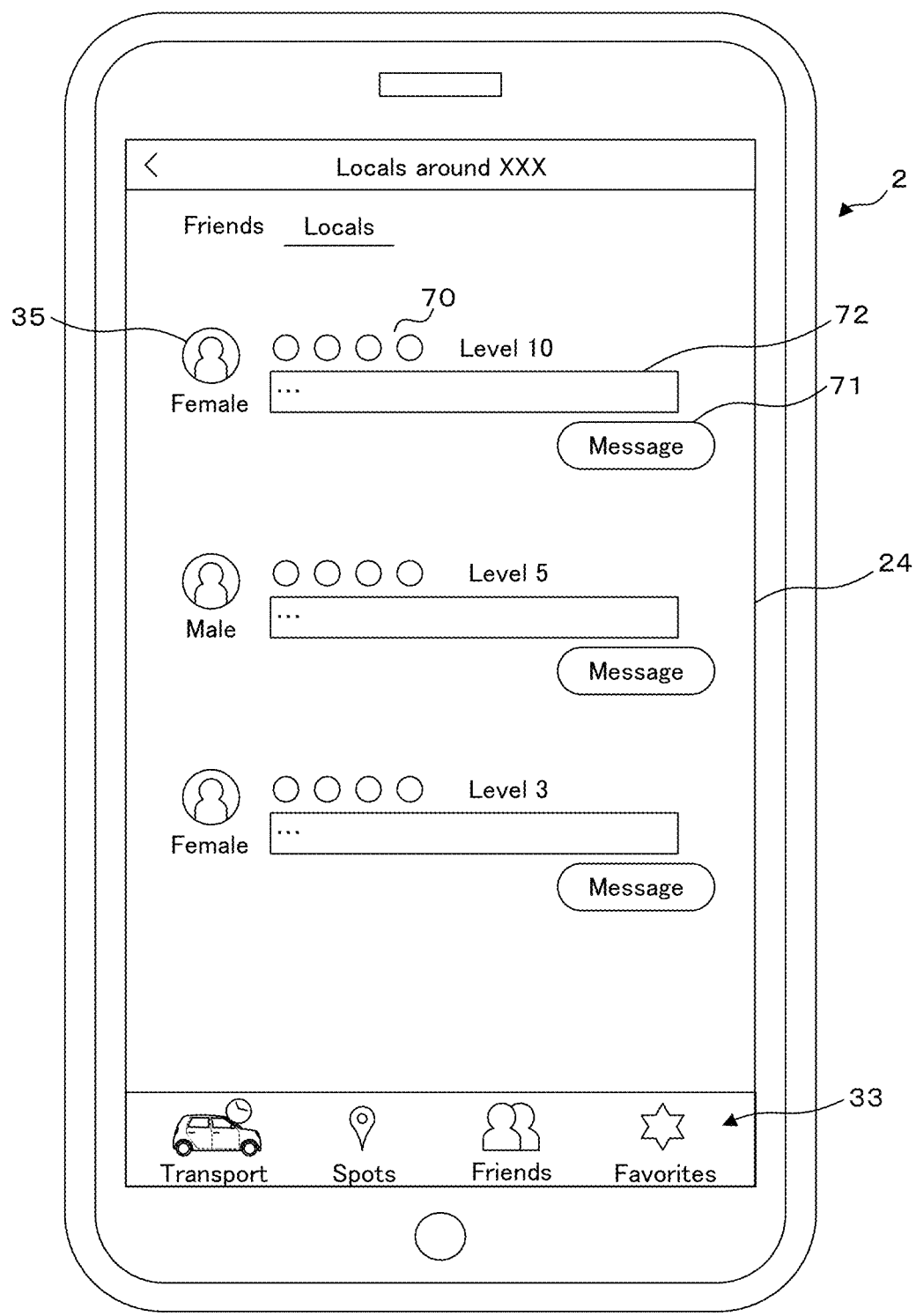
FIG. 32 is a view illustrating an example of a local member selection screen in accordance with the present disclosure.

FIG. 30 is a view illustrating an example of the friend selection screen. FIG. 31 is a view illustrating an example of a layout of records of a friend information DB. FIG. 32 is a view illustrating an example of the local member selection screen. The screens shown in FIG. 30 and FIG. 32 show a list of friends and a list of the local members, respectively. For information relating to the friends and the local members, the user display section 35, a name display section 70, and a message button 71 are displayed. The local member selection screen further displays a comment space 72 showing comments on each local member. Furthermore, a notification ("SNS" in the drawing) is displayed if the user has an SNS (Social Networking Service) account. Selecting each message button 71 can send a message to the corresponding friend or the local member. Also, as shown in FIG. 32, the level is shown for each of the local member.

The server 1 according to the third embodiment 3 stores the friends information DB. As shown in FIG. 31, the friends information DB stores friends and categories of the friends for each user. The category of the friends indicates if the friend is a user of this system or a user of the SNS, for example. When the terminal 2 user requests the server 1 for the display of the friends shown in FIG. 30, the server 1 refers to the friend information DB shown in FIG. 31 and sends necessary information to the terminal 2 user. Then, based on such information, the control unit 21 of the terminal 2 displays the list of friends on the display section 24.

Figure 33:
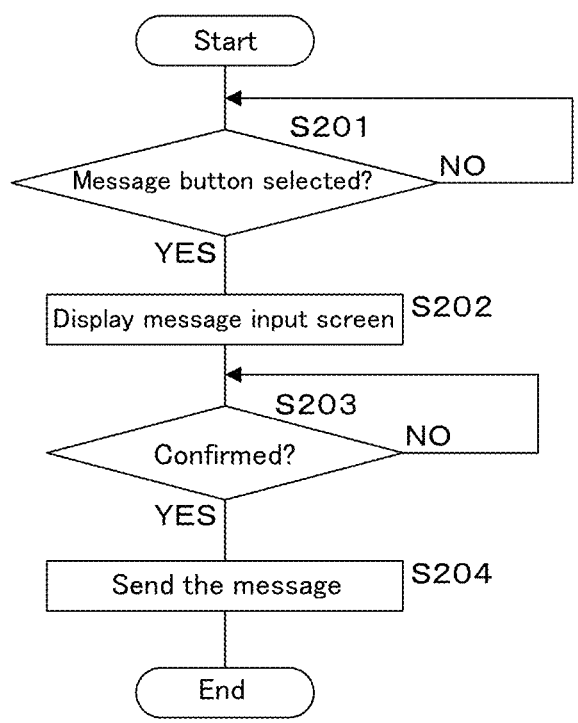
FIG. 33 is a flowchart showing a procedure of a message sending process in accordance with the present disclosure.

FIG. 33 is a flowchart showing a procedure of a message sending process. The control unit 21 checks if the message button 71 is selected or not (S201). If the message button 71 is not selected (S201: NO), the control unit 21 returns the process back to S201. If the message button 71 is selected (S201: YES), the control unit 21 displays a message input screen on the display section 24 (S202).

Figure 34:
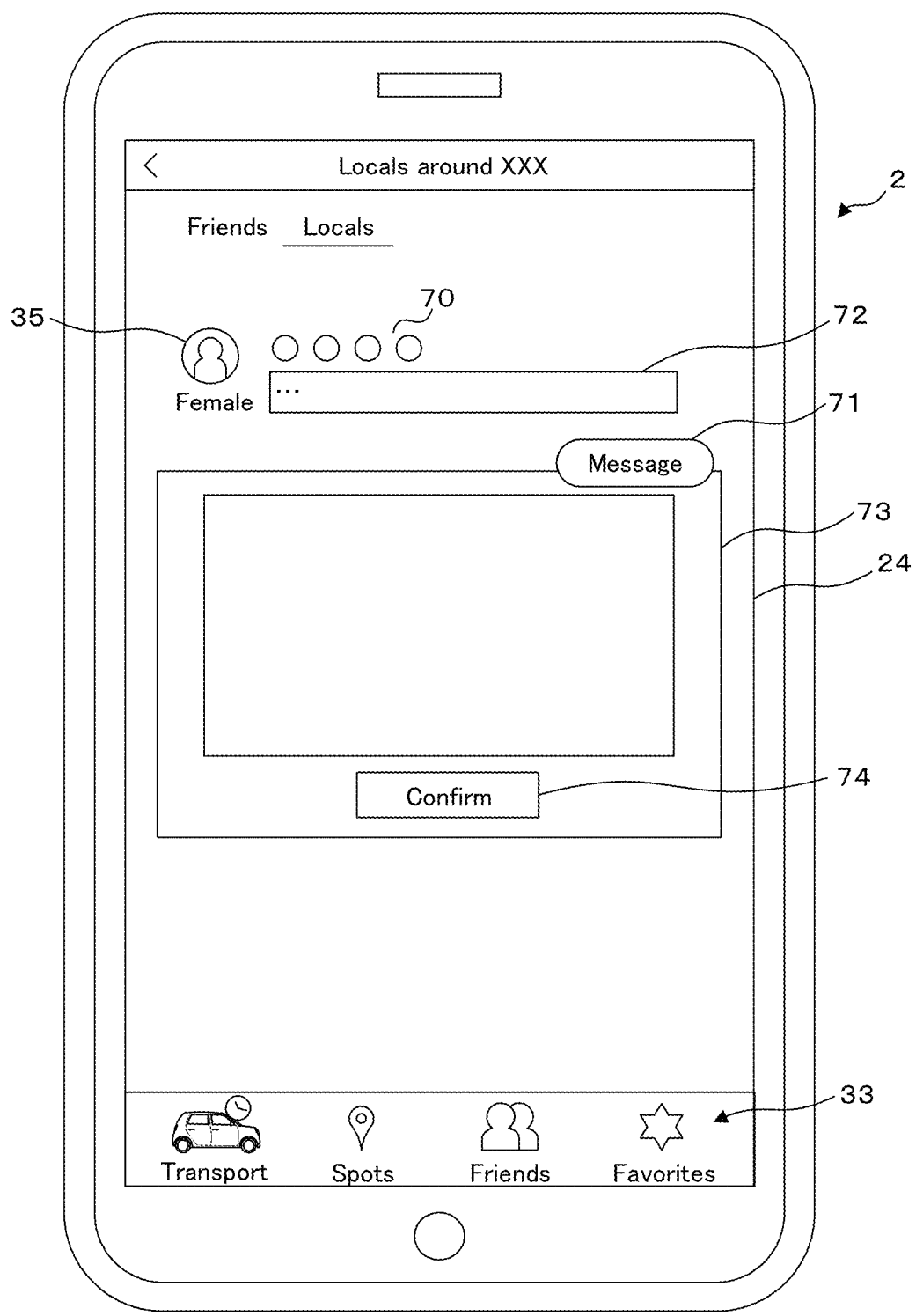
FIG. 34 is a view illustrating an example of a message input screen in accordance with the present disclosure.

FIG. 34 is a view illustrating an example of the message input screen. As shown in FIG. 34, the message input screen includes a message input space 73 and a confirmation button 74. Selecting the confirmation button 74 sends a message entered into the message input space 73 to the friend or the local member. The terminal 2 user may enter the message into the message input space 73 by using the input unit 25. Also, data such as pictures or videos may be attached to the message.

Then, the control unit 21 checks if the confirmation button 72 is selected to confirm the message or not (S203). If the message is not confirmed (S203: NO), the control unit 21 returns the process back to the step S203. If the message is confirmed (S203: YES), the control unit 21 sends the message entered into the message input space 73 to the server 1 (S204) and terminates the process. The server 1 receives the message and sends the message to the corresponding users.

The above embodiment allows the user to obtain information on the other users, such as local residents, who have detailed knowledge about the region. Also, accepting the message transfer allows the users to exchange information with the local members. Also, displaying the SNS user enables wider information exchange.

A function in which the user can reward the other user for the obtained information may be provided. Unlimited examples for the reward include points, electronic money (e-money), and virtual currency. The user can decide freely the type of the reward (points or e-money etc.) and an amount of the reward (how many points etc.). The other user can use the reward given from the user.

Fourth Embodiment

The fourth embodiment of the present disclosure relates to a process for playing videos on the terminal and the server. The same notations as in the first embodiment will be given to the same structures of the information processing system according to the fourth embodiment, and redundant descriptions will be omitted.

Figure 35:
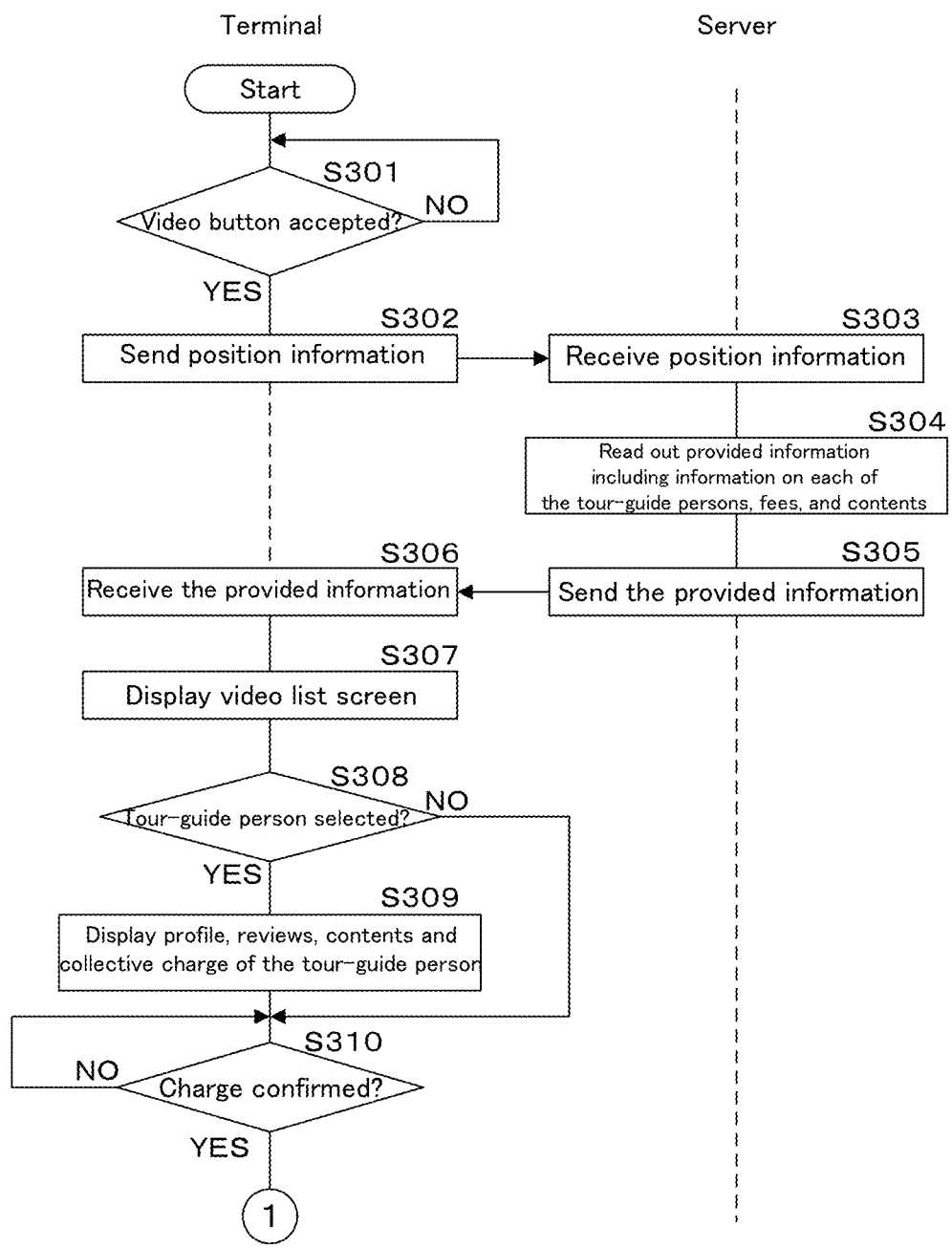
FIG. 35 is a flowchart showing a procedure of a video playing process, which is carried out by a terminal and a server, in a fourth embodiment in accordance with the present disclosure.
Figure 36:
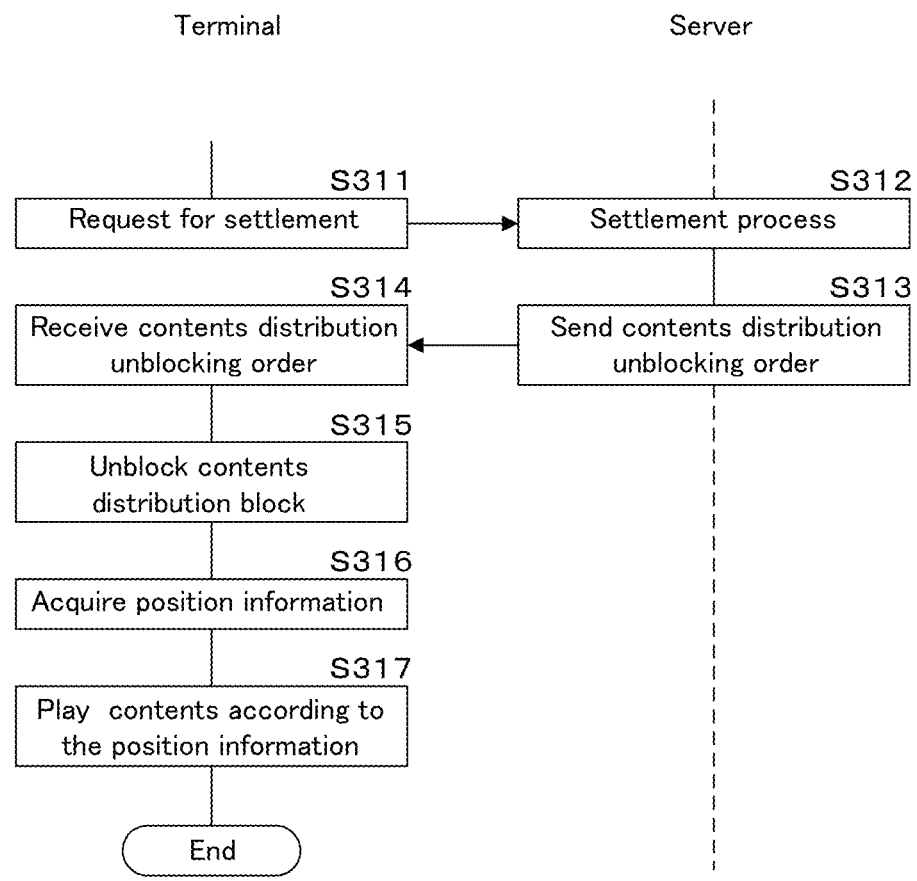
FIG. 36 is a flowchart showing the procedure of the video playing process, which is carried out by the terminal or the server, in the fourth embodiment in accordance with the present disclosure.

The terminal 2 and the server 1 according to the fourth embodiment executes a following video playing process on the region information detail screen (see FIG. 16) and the video list display screen (see FIG. 17), which are the same as in the first embodiment. FIG. 35 and FIG. 36 are flowcharts showing a procedure of the video playing process, which is carried out by the terminal and the server, in the fourth embodiment.

The control unit 21 of the terminal 2 checks if a video button in the type selection section 47b accepts a confirmation by the touching operation or the like (S301). If the video button is not accepted (S301: NO), the control unit 21 returns the process back to the step S301. IF the video button is accepted (S301: YES), the control unit 21 sends the location information detected by the position detector 28.

The server 1 receives the location information sent from the terminal 2 (S303) and reads out the region information relevant to the location information from the each DB stored in the large capacity storage device 14 as information to be provided to the terminal 2 (S304). Here, the provided information includes the tour-guide persons, fees, and contents. The server 1 sends the read-out provided information to the terminal 2 (S305), and the terminal 2 receives the provided information (S306).

The terminal 2 displays the video list display screen based on the received provided information (S307). Here, the video list display screen displays the plurality of the tour-guide persons and the plurality of the contents. The terminal 2 checks if the tour-guide person is selected or not (S308). The tour-guide person is selected when the user touches on the name display section 470 on the video list display screen, for example. If user touches the title display section 471 or the charge display section 472, then the tour-guide person is not selected.

If the tour-guide person is selected (S308: YES), the terminal 2 displays a profile, reviews, contents, and a collective charge of the selected tour-guide person (S309). Here, the collective charge refers to a total charge for using all the contents relevant to the selected tour-guide person, which are displayed on the video list display screen. Then the terminal 2 checks if the charge is confirmed or not (S310). Also, if the tour-guide person is not selected (S308: NO), the terminal 2 moves the process to a step S310.

Then the terminal 2 checks if the charge is confirmed or not (S310). The charge is confirmed when the confirmation button 48 on the region information detail screen is selected by the touching operation, for example. Alternatively, another confirmation button may be displayed on the video list display screen, or the charge may be confirmed by selecting the charge shown on the screen by the touching operation or the like.

If the charge is not confirmed (S310: NO), the terminal 2 returns the process back to the step S310. If the charge is confirmed (S310: YES), a request for settlement is sent to the server 1 by signal transmission, for example (S311). The server 1, to which the settlement is requested, receives the request signal and executes a settlement process (S312). The settlement process includes a payment for the charge on the user's terminal 2, and a process relevant to a reward payment to the tour-guide person who posted the contents that the user used. The process of the payment by the user for the charge and for the reward to the tour-guide person includes withdrawal from a bank account of the user and transfer to a bank account of the tour-guide person.

After executing the settlement process, the server 1 sends a contents distribution unblocking order to the terminal 2 (S313). The terminal 2 receives the contents distribution unblocking order (S314) and unblocks a contents distribution block (S315). Then, the terminal 2 acquires the location information from the position detector 28 (S316), starts playing the contents of the video according to the location information (S317), and terminates the process.

According to the above embodiment, the terminal 2 user can easily select the video and pay the charge. Also, the settlement process can settle the charge for the user and automatically reward the tour-guide person who posted the video according to the user's video usage.

Fifth Embodiment

A fifth embodiment of the present disclosure is different from the above embodiments in that the tourist routes are created in a process that takes schedule information and restricting conditions into consideration. Such differences will be described hereinafter. The other structures and effects of the fifth embodiment are similar to the above embodiments, and thus the same notations will be used therefor and detailed descriptions will be omitted.

Figure 37:
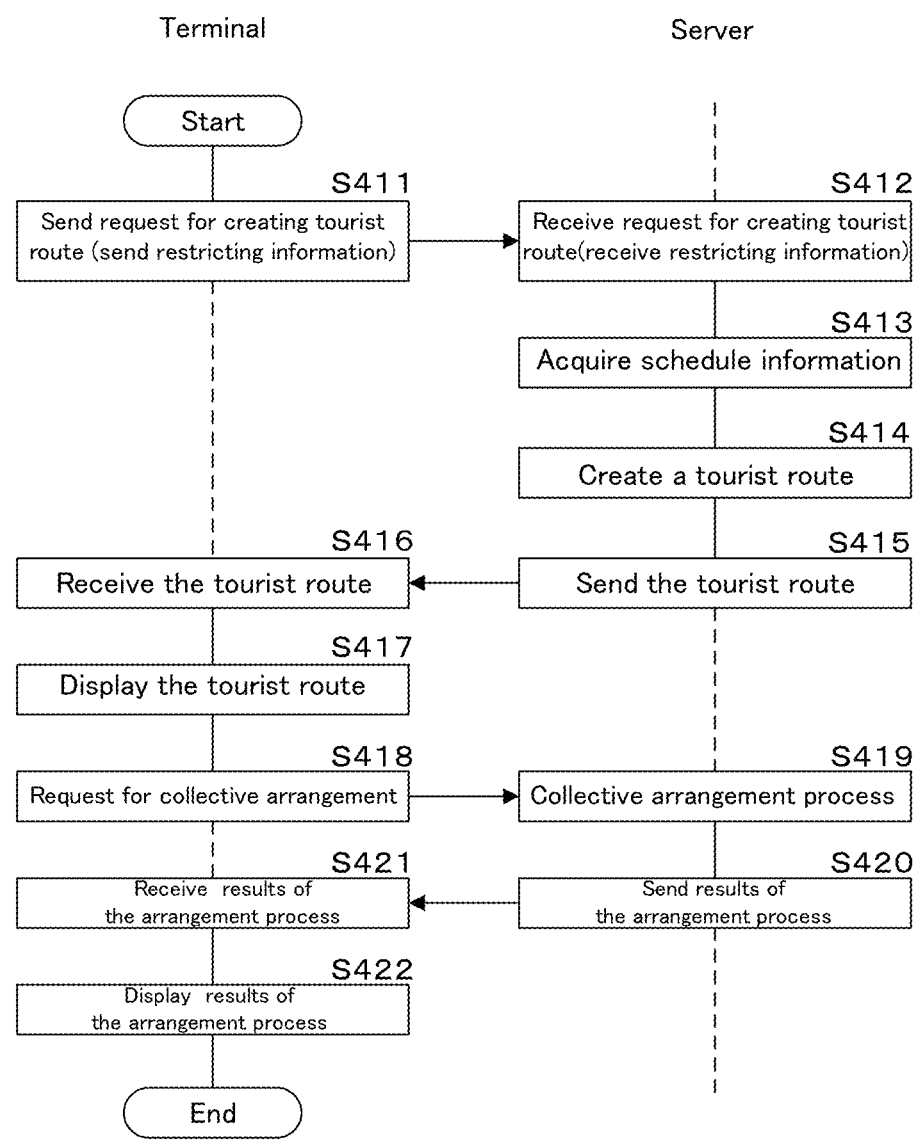
FIG. 37 is a flowchart showing a procedure of a tourist route creating process in a fifth embodiment in accordance with the present disclosure.

FIG. 37 is a flowchart showing a procedure of a tourist route creating process according to the fifth embodiment. The control unit 21 of the terminal 2 accepts a request for creating the tourist route through the input unit 25, and sends the accepted tourist route creating request to the server 1 using the communication unit 23 (S411). For example, the user operates the input unit 25 of the terminal 2 so as to input the starting point, which is the base location of the guided tour, the date and time, which are the tourist schedule, and then the terminal 2 sends the tourist route creating request including the tourist schedule to the server 1. The tourist schedule is optional information, and the control unit 21 may accept only the base location and sends the tourist route creating request to the server 1 including the accepted base location to the server 1 using the communication unit 23. The tourist schedule is optional also in the embodiments 1 to 4. Also, a goal point may be entered. The goal point may be the same as or different from the starting point.

Also, the control unit 21 may accept through the input unit 25 restricting information for restricting the tourist routes. The restricting information includes information on locations to be visited or locations not to be visited. The control unit 21 may send the accepted restricting information together with the route creation request to the server 1. The locations to be visited include tourist spots where the user wants to visit for sightseeing, restaurants, hotels, and so on. The locations not to be visited include tourist spots, restaurants, waypoints, etc. where the user does not want to visit. The restricting information may also include the category etc.

The control unit 11 of the server 1 receives through the communication unit 13 the tour creation request and the restriction information that are sent from the terminal 2 (a step S412). The control unit 11 retrieves the user's schedule information from an external server (omitted in the drawing), which is connected to the network N (a step S413). The schedule information includes information linking the user's location and the time. For example, the schedule information includes information on dates, times, and places of departure and arrival for transport such as trains, buses, airplanes, and ships, information on names, locations, and schedule for the hotels to stay, or locations to be visited and its time. The large quantity storage device 14 of the server 1 may store the user's schedule information.

Then, the control unit 11 creates the tourist route based on the received tourist route creation request, which includes the base location, tour time, the restricting information, and the schedule information (a step S414). The control unit 11 may search the tourist route having a minimum evaluation function, for example. The evaluation function may be a function that increases as the user's travelling distance and time increases, and decreases as the number of the tourist spots on the way increases and the reviews thereof are higher, for example. Also, the evaluation function may increase as the tourist route conflicts more with the schedule information and restrictions given in the restricting information. A method for creating the tourist route is unlimited and the above method is just an example. The server 1 may also create a plurality of the tourist routes as the search results.

The server 1 sends the information on the tourist route or the plurality of the plurality of the tourist routes to the terminal 2 (a step S415). The terminal 2 receives the tourist route information sent from the server 1 (a step S416) and displays the received tourist route(s) on the display unit 24 (a step S417).

The control unit 21 of the terminal 2 accepts through the input unit 25 operations including a selection of the tourist routes and a part arrangement or a collective arrangement of services and tickets etc. that are necessary for the tour. The control unit 21 then sends a request to the server 1 for the collective arrangement of the various services necessary for the selected tourist route (a step S418). For example, the terminal 2 may display a screen for operating the collective arrangement on the display screen 24, which allows the user to operate the operating screen to request the collective arrangement. The terminal 2 may also display the icon for selection of transport on the same screen as in FIG. 13, and may accept the collective arrangement operation at the time of accepting the selection of transport. The collective request may include requests for arrangements for taxi, purchasing tickets for the tourist spots, arrangements for tour-guide person, reservations for restaurants, and so on.

When the server 1 receives the request for the collective arrangement from the terminal 2, the control unit 11 executes a collective arrangement process (a step S419). The control unit 11 may execute the collective arrangement process for the taxi arrangements, the ticket purchase, the tour-guide person arrangements, and the restaurant reservations as a closed-electronic process. Alternatively, humans may be involved in a part of the process. As an example for the process involving humans, after the control unit 11 executes the settlement for tickets and the like, the information on the tickets that have been settled may be sent to the terminal of a taxi driver in charge, who then may be able to hand the settled tickets or the like to the user when the user uses the taxi.

Next, the server 1 sends results of the arrangement process to the terminal (a step S420), the terminal 2 receives the results of the arrangement process (a step S421), displays the results of the collective arrangement process (a step S422), and terminates the process.

According to the above embodiment, the server 1 and the terminal 2 can accept the base location of the guided tour, automatically create the tourist route(s), and show the guided tour(s) to the user.

Also, the server 1 and the terminal 2 can take the restricting information into consideration when automatically creating the tourist route(s), and show the guided tour(s) to the user.

Furthermore, the server 1 and the terminal 2 can retrieve the user's schedule information when automatically creating the tourist route(s), and show the guided tour(s) to the user.

Furthermore, the server 1 and the terminal 2 also can collectively process various arrangements that are necessary for the guided tour.

Sixth Embodiment

A sixth embodiment of the present disclosure is different from the above-mentioned fifth embodiment in that the process for creating the tourist route takes a taxi share ride into consideration. Thus, such differences will be described mainly hereinafter. The other structures and effects of the present embodiment are similar to the above embodiments, and thus the same notations will be used therefor and detailed descriptions will be omitted.

The information processing system according to the sixth embodiment includes a taxi information server, which is omitted in the drawing. The taxi information server is connected to the network N. The server 1 can access the taxi information server through the network N.

The server 1 sends to the taxi information server inquiry information including a request asking for a taxi fare, get-on point information, and get-off point information. The get-on point information indicates a location where the user gets on the taxi, and the get-off point information indicates a location where the user gets off the taxi. Also, if the route includes a waypoint, the server 1 sends to the taxi information server the inquiry information including the get-on point information, waypoint information, and the get-off point information.

The taxi information server receives the inquiry information sent from the server 1. The taxi information server calculates the taxi fare based on the get-on point information and the get-off point information that are included in the inquiry information, and sends information of the calculated taxi fare to the server 1. If the inquiry information includes the waypoint, the taxi information server calculates the taxi fare between the get-on point and the get-off point, as well as the taxi fare between the get-on point and the waypoint, and sends reply information including the calculated taxi fares to the server 1. There may be a plurality of the waypoints. In such a case, the taxi fares between the get-on point, the plurality of the waypoints, and the get-off point may be calculated. The taxi information server may also send a late-night taxi rate as well as the regular taxi fare to the server 1.

The server 1 receives the reply information sent from the taxi information server. Based on the taxi fares included in the received reply information, the server 1 can calculate the taxi fare necessary for travelling the tourist route. The server 1 can also calculate the taxi fares necessary for a plurality of the users sharing a ride to travel the tourist route.

If the get-on point and the get-off point are the same for the plurality of the users sharing the ride, the server 1 can ask and retrieve the taxi information server for the taxi fare for a ride between the get-on point and the get-off point, and, by dividing the retrieved fare by the number of the users, a share-ride taxi fare can be calculated. A prescribed commission may be subtracted from the share-ride taxi fare.

If the get-on point and the get-off point are different between the plurality of the users sharing the ride, the server 1 may ask the taxi information server for the taxi fare with the users' different get-on points and the get-off points as the waypoints, and calculate the share-ride taxi fare based on the retrieved taxi fares. For example, if the get-on point for a first user and a second user is the same and the get-off points are different, the server 1 may divide the taxi fare from the get-on point to a waypoint by the number of the users to find the share-ride fare for the first user who gets off at the waypoint. Also, the server 1 may find the taxi fare for the second user by subtracting the share-ride fare from the taxi fare from the get-on point to the get-off point. The same method of calculation may be applied when the get-on points are different and the get-off point is the same. Also, if both the get-on points and the get-off points are different, with the get-on point and the get-off point of the second user being on the way from the get-on point and the get-off point of the first user, the share-ride fare for each user can be similarly calculated by setting two waypoints.

When the server 1 receives inquiries about the tourist routes from the plurality of the users, the server 1 searches the plurality of the users who ask for similar tour time zones and the tourist routes and calculates the share-ride fare so that the server 1 can provide to each of the users the share-ride taxi fare for touring around the tourist sites by taxi.

Figure 38:
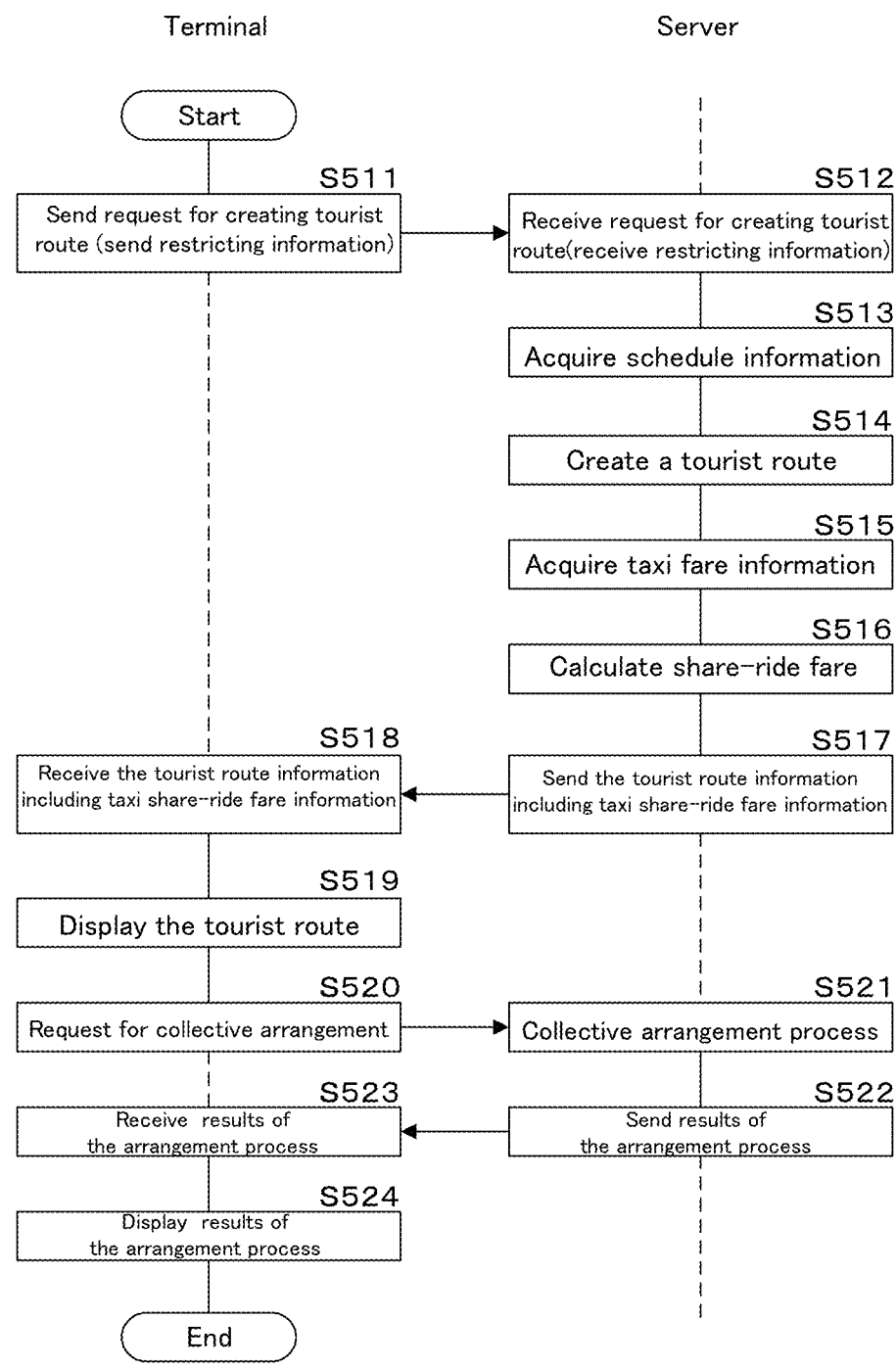
FIG. 38 is a flowchart showing a procedure of a tourist route creating process that takes a taxi share ride into consideration in a sixth embodiment in accordance with the present disclosure.

FIG. 38 is a flowchart showing a procedure of a tourist route creating process that takes the taxi share ride into consideration in the sixth embodiment. The terminal 2 and the server 1 execute the same process as in S411 to S414 in the fifth embodiment to create the tourist route (steps S511 to S514). After finishing the process in the step S514, the server 1 inquires the taxi fare server and retrieves the taxi fare information corresponding to the tourist routes of the plurality of the users (a step S515), and calculates the share-ride fares (a step S516). The method for calculating the share-ride fare is as above. The server 1 specifies the plurality of the users having the same or partly overlapping tourist routes within the same tour time zone, specifies the get-on point and the get-off point of each user, and calculates the share-ride fares by using the above method.

The server 1 sends the tourist route information including the taxi share-ride fare to the terminal 2 (a step S517). The terminal 2 receives the taxi share-ride fare and the tourist route information (a step S518) and displays the tourist route information including the share-ride fare information on the display unit 24 (a step S519).

Next, the terminal 2 accepts through the input unit 25 a collective arrangement including whether to use the taxi share-ride or not, and sends a request for the collective arrangement to the server 1 (a step S520). Then, the server 1 executes the similar processes (steps S521 to S524) relating to the collective arrangement as in S419 to S422 in the fifth embodiment, and terminates the process. In the step S521, the server 1 executes processes for asking the plurality of the users for agreement on the share ride and sending information on the share ride locations etc. to each of the agreed users.

According to the above embodiment, the server 1 and the terminal 2 can provide the taxi share-ride fare together with the tourist route.

Seventh Embodiment

A seventh embodiment of the present disclosure is different from the above-mentioned fifth and sixth embodiments in that the process for creating the tourist route takes matching of the tour-guide person into consideration. Thus, such differences will be described mainly hereinafter. The other structures and effects of the present embodiment are similar to the above embodiments, and thus the same notations will be used therefor and detailed descriptions will be omitted.

Figure 39:
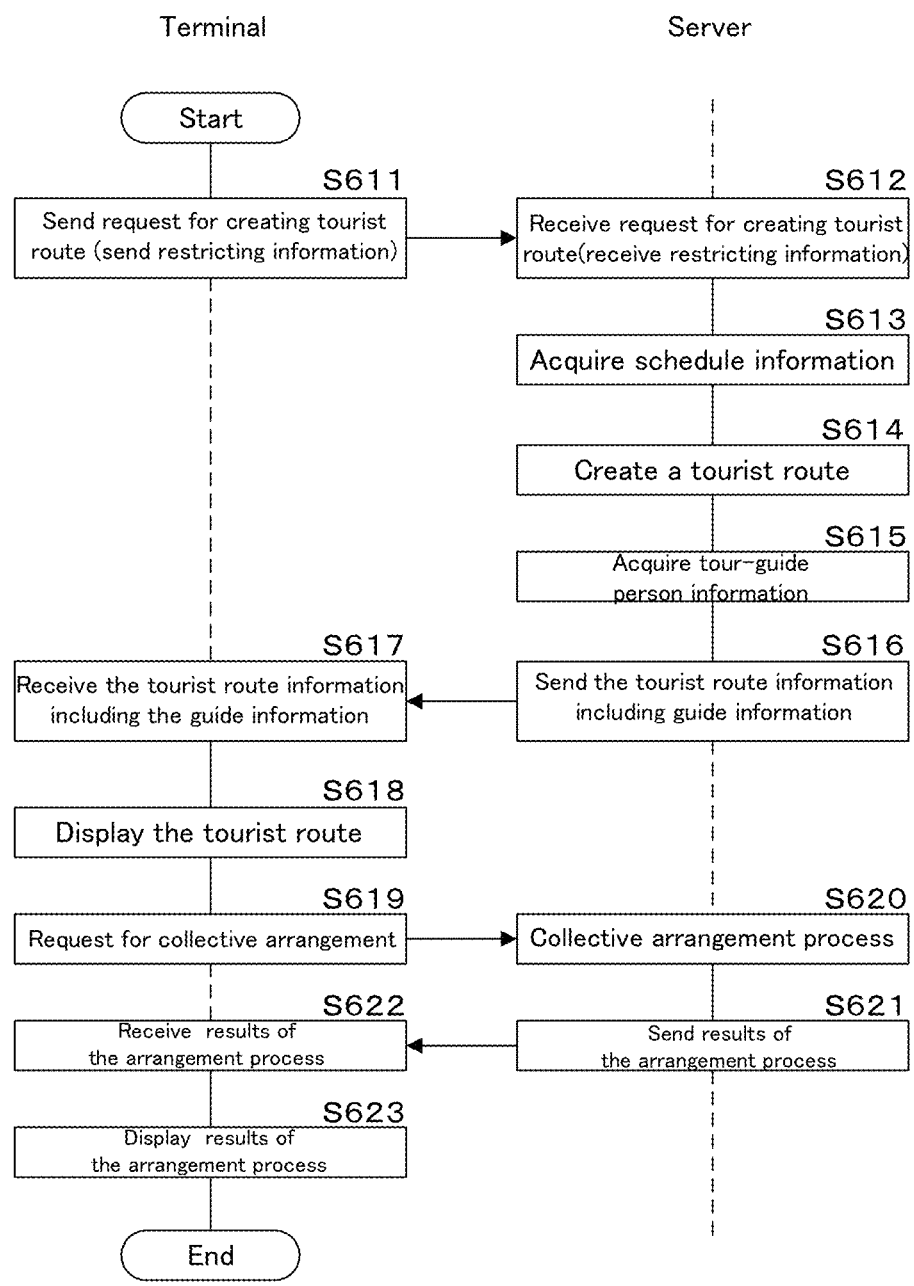
FIG. 39 is a flowchart showing a procedure of a tourist route creating process that takes a tour-guide person into consideration in a seventh embodiment in accordance with the present disclosure.

FIG. 39 is a flowchart showing the procedure of the tourist route creating process that takes the tour-guide person into consideration in the seventh embodiment. The terminal 2 and the server 1 execute the same processes as in S411 to S414 in the fifth embodiment to create the tourist route (steps S611 to S614). After finishing the step S614, the server 1 retrieves information relevant to the tour-guide persons corresponding to the tourist route from the region information DB141 (a step S615). The tour-guide person in the seventh embodiment is mainly a guide by humans (may be a guide by playing the video), and the region information DB 141 stores information including tourist spots, time zones, the number of tourists, and languages that the guide person can guide, and the guide person's level and type (casual or formal).

The server 1 sends the tourist route information including the tour-guide person information to the terminal 2 (a step S616). The terminal 2 receives the tour-guide person information and the tourist route information (a step S617), and displays the tourist route including the tour-guide person information on the display unit 24 (a step S618).

Next, the terminal 2 accepts through the input unit 25 a collective arrangement including whether to use the tour-guide person or not, and the name and ID of the tour-guide person if the guide is to be used, and sends a request for the collective arrangement to the server 1 (a step S619). Then, the server 1 executes the similar processes (steps S620 to S623) relating to the collective arrangement as in S419 to S422 in the fifth embodiment, and terminates the process.

According to the above embodiment, the server 1 and terminal 2 can provide the tour-guide person information together with the tourist route.

Eighth Embodiment

An eighth embodiment of the present disclosure is different from the above-mentioned embodiments in a process for collecting information from the friends. Thus, such difference will be described mainly hereinafter. The other structures and effects of the present embodiment are similar to the above embodiments, and thus the same notations will be used therefor and detailed descriptions will be omitted.

Figure 40:
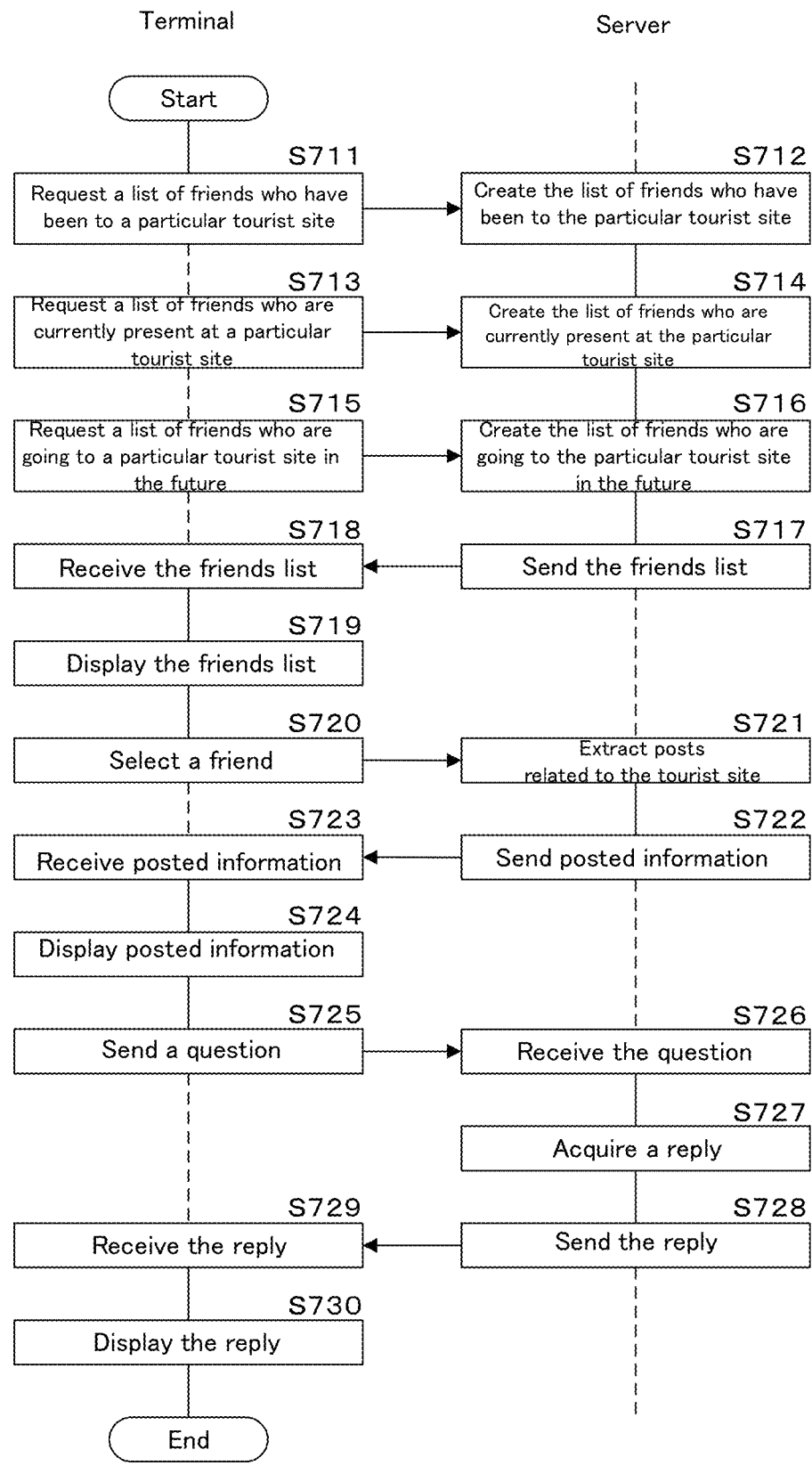
FIG. 40 is a flowchart showing a procedure of a process for displaying a friend list and posted information in an eighth embodiment in accordance with the present disclosure.

FIG. 40 is a flowchart showing a procedure of a process for displaying a friend list and posted information in the eighth embodiment. When accepting the departure point, which is the base location of the guided tour, and a request for displaying a list of the friends who have been to particular tourist site in the past, the server 1 sends a request for the friend list to the server 1 (a step S711). The particular tourist site means a tourist site relevant to the base location, or a location showing a range of the tourist site. The server 1, in response to the request, extracts from the friend information DB information on the friends who visited the tourist site relevant to the base location in the past and creates the friend list (a step S712). The friend information DB according to the eighth embodiment stores information including a friend's ID, which identifies the friend, a friend's name, the location information, the location information to be visited, the posted information, and an address for communication, which are all linked to each other. The location information indicates locations where the friend has been to or has visited in the past up to the present. The posted information includes, for example, attractions of the particular tourist site, good restaurants, and recommended tourist spots.

Also, when accepting the departure point, which is the base location of the guided tour, and the request for displaying a list of the friends who is currently is at the particular tourist site, the terminal 2 sends a request for the friend list to the server 1 (a step S713). The server 1, in response to the request, extracts from the friend information DB information on the friends who are currently at the tourist site relevant to the base location and creates the friend list (a step S714).

Furthermore, when accepting the departure point, which is the base location of the guided tour, and a request for displaying a list of the friends who are going to the particular tourist site in the future, the terminal 2 sends the request for the friend list to the server 1 (a step S715). The server 1, in response to the request, extracts from the friend information DB information on the friends who are going to the tourist site relevant to the base location and creates the friend list (a step S716).

The server 1 then sends the friend list created during the process either in S712, S714, or S716 to the terminal 2 (a step S717). The terminal 2 receives the friend list sent from the server 1 (a step S718) and displays the received friend list (a step S719).

The terminal 2 accepts selection of the friends through the input unit 25 and sends information designating the accepted friend to the server 1 (a step S720). The server 1 receives the information sent from the terminal 2, extracts the posted information relating to the particular tourist site out of the posted information posted by the friend designated in the received information (a step S721), and sends the extracted posted information to the terminal 2 (a step S722).

The terminal 2 receives the posted information sent from the server (a step S723) and displays the received posted information on the display unit 24 (a step S724). The user of the terminal 2 can view the posted information posted by the friends who have been to the particular tourist site.

The user can also ask a question to the friend about information that cannot be obtained from the posted information. In particular, the terminal 2 accepts a question from the user to the friend through the input unit 25 and sends the accepted question to the server (a step S725). The server 1 receives the question sent from the terminal 2 (a step S726) and collect a reply(s) from the friend or a plurality of the friends in response to the received question (a step S727). The server 1 collects the reply by sending information including the question and a request for the reply to the address of the friend(s) who have been to the particular tourist site. The user may also specify the friend to whom the question is to be sent.

After obtaining the reply, the server 1 sends the collected reply to the terminal 2, which originally sent the question (a step S728). The terminal 2 receives the reply sent from the server 1 (a step S729), displays the received reply (a step S730), and terminates the process.

According to the above embodiment, the server 1 and the terminal 2 can provide the user the list of the friends who have been to the particular tourist site, the list of the friends who are currently at the particular tourist site, and the list of the friends who are going to visit the particular tourist site in the future.

The server 1 and the terminal 2 can also extract the posted information relating to the particular tourist site posted by the friend, and provide the extracted information to the user.

Furthermore, the user can send a question relating to the tourist site to the friend, and the server 1 and the terminal 2 can collect and provide the reply from the friend in response to the question.

Ninth Embodiment

A ninth embodiment of the present disclosure is different from the above-mentioned embodiments in a process for purchasing merchandise via AR or VR. Thus, such difference will be described mainly hereinafter. The other structures and effects of the present embodiment are similar to the above embodiments, and thus the same notations will be used therefor and detailed descriptions will be omitted.

FIG. 41 is a view illustrating an example of a layout of records of a merchandise DB that stores information relevant to objects or shops. The merchandise DB stores and links the objects relevant to the tourist spots with features that can be obtained from pictures of shops selling the merchandise, the location information of the objects, the name of the tourist spots, merchandise information of the objects, the event information, pictures, and videos. The structure of the database is unlimited.

Figure 42:
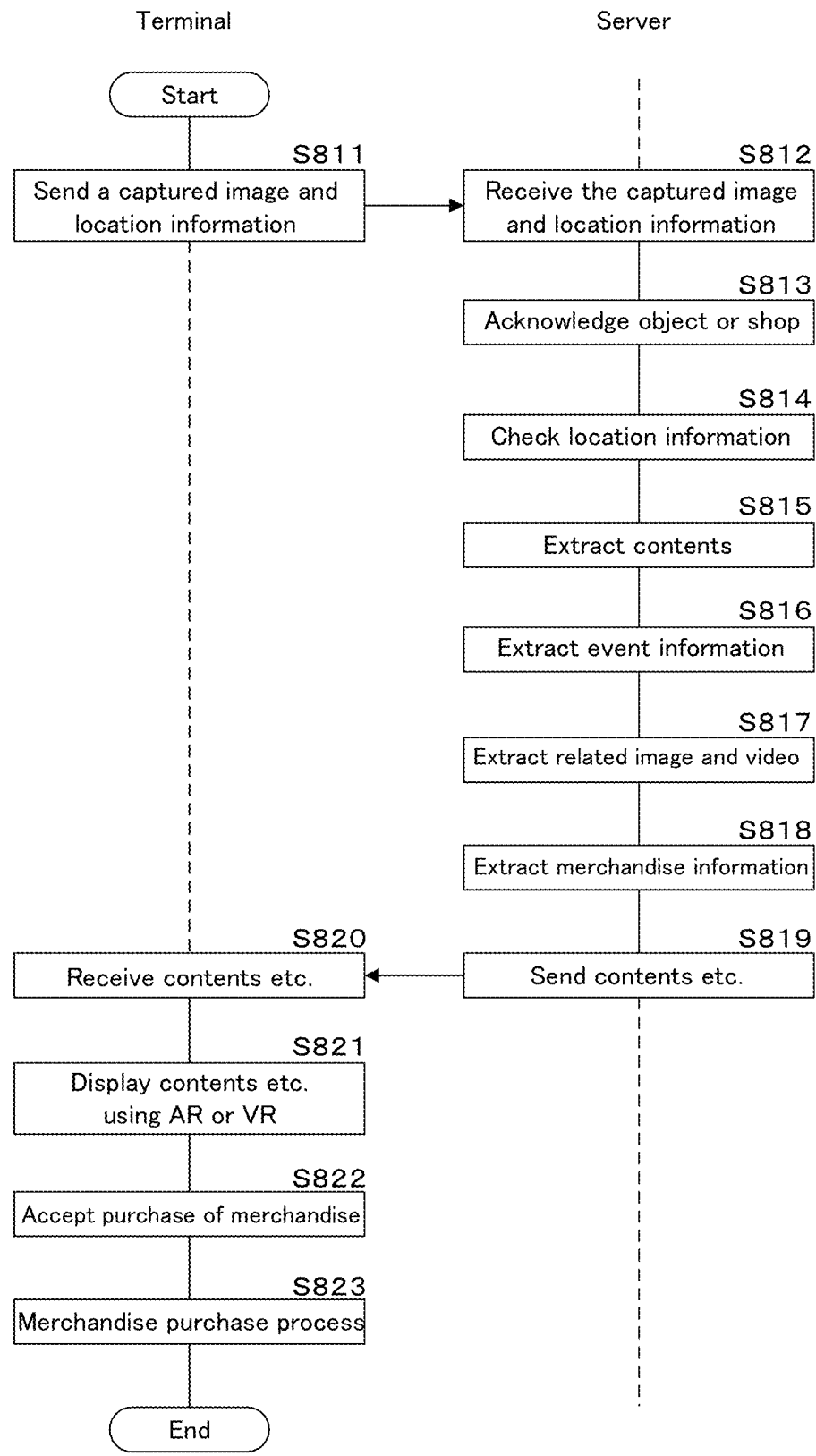
FIG. 42 is a flowchart showing a procedure of a merchandise sales process using AR or VR in a ninth embodiment in accordance with the present disclosure.

FIG. 42 is a flowchart showing a procedure of a merchandise sales process through AR or VR in the ninth embodiment. The terminal 2 sends an image taken by the image capturing unit 27 and the location information detected by the position detector 28 to the server 1 (a step S811). The server 1 receives the captured image and the location information sent from the terminal 2 (a step S812), and acknowledges an object or a shop included in the image (a step S813). For example, the server 1 extracts the object included in the captured image and calculates a feature of the extracted object. Then, the server 1 refers to the merchandise DB using the calculated feature to acknowledge the object or the shop. Also, the server 1 checks whether the location information acquired from the terminal 2 matches the location information obtained from the merchandise DB or not (a step S814). That is, the server 1 checks whether the user is actually present at a location where the real object or the shop exists and taking the picture of the object or the shop, or not. Here, the checking of the location information is optional. Alternatively, contents or the like may be displayed only when the user is present at the objects' location.

Then, the server 1 extracts contents relating to the specified object from the region information DB141 (a step S815). The server 1 also extracts event information relating to the specified object from the merchandise DB (a step S816). The event information may be extracted from the region information DB141. Furthermore, the server 1 extracts images and videos relating to the specified object from the merchandise DB (a step S817). The server 1 further extracts merchandise information relating to the specified object or the shop from the merchandise DB (a step S818).

Then, the server 1 sends the extracted contents, the event information, the relating images and videos, and the merchandise information to the terminal 2 (a step S819). The terminal 2 receives the contents etc. sent from the server 1 (a step S820) and displays the contents etc. using AR (Augmented Reality) or VR (Virtual Reality) (a step S821). A method for displaying the contents etc. is unlimited. If there are the multiple images and videos relating to the object, the server 1 may select and display the video or the image having high reviews.

While the merchandise information is being displayed, the terminal 2 can accept purchase of the merchandise through the input unit 25 (a step S822). The purchase of the merchandise may be done by a gesture operation or a voice operation. When accepting the purchase of the merchandise, the terminal 2 executes a purchasing process of the merchandise (a step S823) and terminates the process.

According to the above embodiment, the server 1 and the terminal 2 can display the contents, the event information, the relative images and videos, and the merchandise information relating to the objects of the tourist spots using AR or VR.

The server 1 and the terminal 2 can also execute the purchasing process of the merchandise displayed by using AR or VR.

Although a real-time purchasing process in which the captured image is sent immediately to the server 1 for purchasing the merchandise relating to the objet via AR or VR has been described, the embodiment is not limited to the above. For example, the embodiment may be configured so that the captured video or the still image including the location information may be sent to the server 1 after the guided tour. The server 1 may execute the processes of S813 to S820 based on the sent video or the still image and provide the terminal 2 the merchandise information relating to the objects included in the video or the still image. The user may operate the terminal 2 for purchasing the merchandise of the objects.

Also, in the real-time purchasing process in which the captured image is sent immediately to the server 1 for purchasing the merchandise relating to the objet via AR or VR, the server 1 may execute a process for arranging a shipment of the merchandise so that the user can receive the merchandise while travelling the tourist route. For example, the server 1 may send the merchandise information to the taxi driver or the other scheduled share-ride user so that the taxi driver or the other user can hand the merchandise to the user who purchased the merchandise.

Tenth Embodiment

The tenth embodiment of the present disclosure is different from the above-mentioned embodiments in a process for copy prevention of contents. Thus, such difference will be described mainly hereinafter. The other structures and effects of the present embodiment are similar to the above embodiments, and thus the same notations will be used therefor and detailed descriptions will be omitted.

Figure 43:
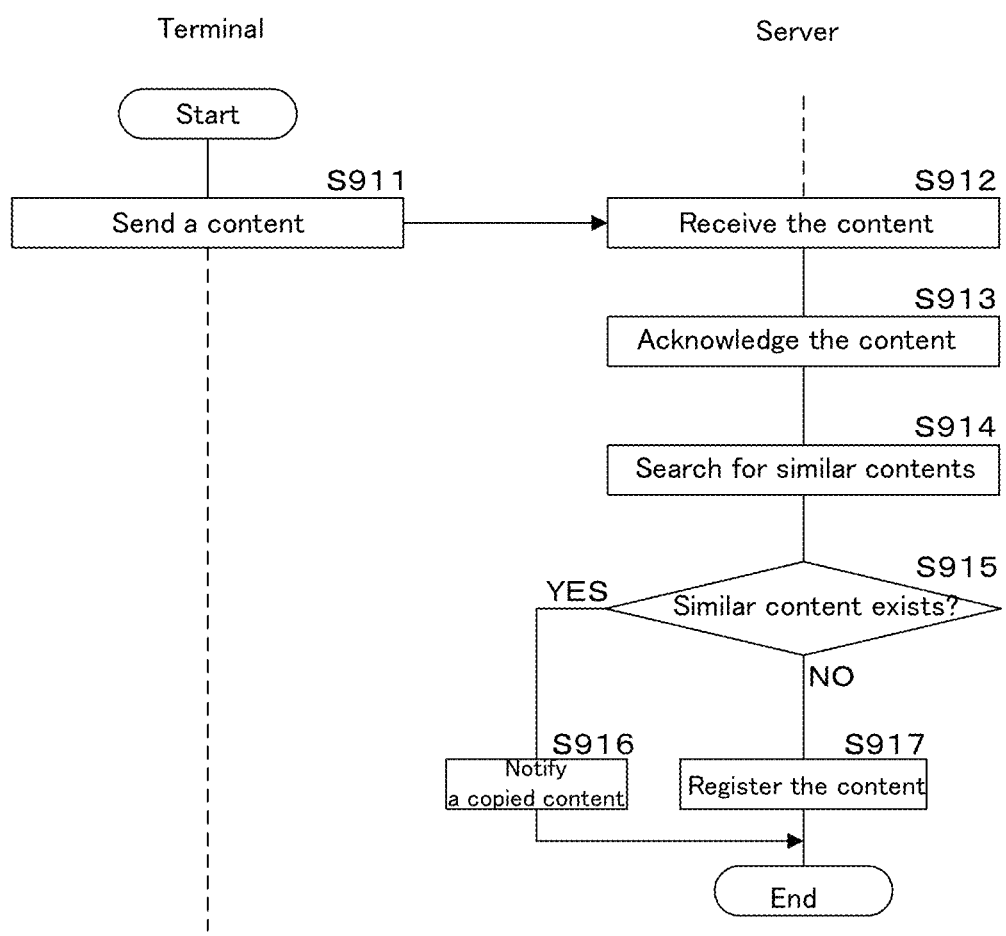
FIG. 43 is a flowchart showing a procedure of a copy content detection process in a tenth embodiment in accordance with the present disclosure.

FIG. 43 is a flowchart showing a procedure of a copy content detection process in the tenth embodiment.

The terminal 2 sends a content relevant to a tourist site following the user operation (a step S911). Here, the content shall be a video including sounds. The server 1 receives the content sent from the terminal 2 (a step S912). Then, the server 1 executes a process for acknowledging the content (a step S913). For example, the sound included in the video may be converted into text information.

Next, the server 1 searches the region information DB 141 for a content that is similar to the content received in the step S912 (a step S914), checking if there are any similar contents registered in the database or not (a step S915). For example, the server 1 may check the similarities of the contents by comparing vector data of the text information obtained from acknowledging the video content with vector data of the contents stored in the region information DB141. Also, a learnt model (AI) may be used to check the similarities of the contents. It is preferable that, when registering the contents to the region information DB141, the server 1 calculates and registers the vector data for the text information of the sound of the contents.

If a similar content exists (a step S915: YES), the server 1 notifies the manager that there is a suspicion of copies (a step S916) and terminates the process. If there are no similar contents found (a step S915: NO), the server 1 registers the content to the region information DB 141 (a step S917) and terminates the process.

According to the above embodiment, the server 1 and the terminal 2 can detect copies of contents so as to prevent registering the copied contents on the region information DB 141.

All of the embodiments disclosed above are examples and should not be regarded as limiting. The technical scope of the present disclosure is not limited to what has been described above. Rather the scope of the present disclosure is defined by the claims below, and it will be understood that various examples of changes or modifications within the meaning or the scope equivalent to the scope of claims belong to the scope of the disclosure. That is, embodiments obtained through combining the skills modified within the scope disclosed in the claims belong to the technical scope of the present disclosure.

The invention claimed is:

1. A non-transitory computer-readable recording medium storing a computer executable program which, when executed by a computer, cause the computer to:
   receive location information from a terminal device, the location information indicating a location of the terminal device;
   identify, from among data stored in the computer, region information based on the location information, the region information being posted by a region affiliated person, the region affiliated person being a person affiliated with a region including the location, and the region affiliated person including a tour-guide person;
   send the region information to the terminal device, the region information including information relevant to accepting a reservation for a on-site human guided tour of a tourist spot conducted by the tour-guide person, and contents relevant to a non-human guided tour of the tourist spot provided by the tour-guide person;
   send display selection information to the terminal device, to display a guide type selection screen on the user terminal device, the guide type selection screen including an icon for the reservation of the human guided tour and an icon for the non-human guided tour; and
   in response to a selection of the guide type from the terminal device, accept the selection of the guide type.

2. The non-transitory computer-readable recording medium according to claim 1, wherein
   the contents relevant to the non-human guided tour of the tourist spot includes a video or a sound that are provided by the tour-guide person, the computer is further configured to:
   accept the reservation for the guided tour conducted by the tour-guide person upon selection of the icon relevant to the human guided tour; and
   provide the terminal device with the contents to play the video or the sound that are relevant to the tour-guide person upon selection of the icon relevant to the non-human guided tour.

3. The non-transitory computer-readable recording medium according to claim 1, wherein the computer is further configured to:
   generate tourist route information based on a base location that indicates a starting point of a tour; and
   send the tourist route information to the terminal device to output the generated tourist route on the terminal device.

4. The non-transitory computer-readable recording medium according to claim 3, wherein
   the tourist route information includes tour-guide person information which includes tourist spots, time zones, a number of tourists, and languages that the tour-guide person can guide, and a level and a selection of casual or formal class of the tour-guide person.

5. The non-transitory computer-readable recording medium according to claim 3, wherein the computer is further configured to:
   upon a request for displaying a friend list including information on friends who have been to a tourist site relevant to the base location in the past, generate a first friend list by extracting information on the friends who have been to the tourist site relevant to the base location, based on information retrieved from a friend information database, which links a friend's ID, location information indicating locations where the friend has been to or has visited in the past up to the present, information on locations to be visited, and posted information relevant to the tourist spot;
   upon a request for displaying another friend list including information on friends who are currently present at the tourist site relevant to the base location, generate a second friend list by extracting information on the friends who are currently present at the tourist site relevant to the base location, based on information retrieved from the friend information database;
   upon a request for displaying a third friend list including information on friends who are going to the tourist site relevant to the base location, generate a third friend list by extracting information on the friends who are going to the tourist site relevant to the base location, based on information retrieved from the friend information database;
   sending at least one of the first friend list, the second friend list, and the third friend list to the terminal device to be displayed on the terminal device;

receiving information from the terminal device, designating a friend selected from at least one of the first friend list, the second friend list, and the third friend list;

extracting the posted information relevant to the tourist site from the posted information posted by the friend designated by the received information; and sending the extracted posted information to the terminal device.

6. The non-transitory computer-readable recording medium according to claim 3, wherein the computer is further configured to:

generate the tourist route information based on restricting information for restricting the tourist route, the base location, and the region information, the restricting information including locations to be visited and locations not to be visited.

7. The non-transitory computer-readable recording medium according to claim 3, wherein the computer is further configured to:

generate the tourist route information based on information relevant to the user who wants to share a taxi ride, the base location, and the region information.

8. The non-transitory computer-readable recording medium according to claim 1, wherein the computer is further configured to:

accept a request from the terminal device for a collective arrangement for a plurality of services for the tour, the collective arrangement including a request for an arrangement for the tour-guide person and a taxi, purchasing a ticket for the tourist spot, or a reservation for a restaurant; and execute processes corresponding to the collective arrangement.

9. The non-transitory computer-readable recording medium according to claim 1, wherein the computer is further configured to:

accept a selection of the region information from the terminal device;

control the terminal device to display a first screen that displays a plurality of the selectable contents;

upon selection of one of the contents on the first screen, control the terminal device to display a second screen that displays a plurality of selectable guide types of the content; and accept a selection of the guide type on the second screen.

10. The non-transitory computer-readable recording medium according to claim 1, wherein at least one of the contents is a video, and wherein the computer is further configured to determine a replay point of the video based on the acquired location information of the terminal device, location information of the tourist spot, and information from a video information database which stores a starting time of the guide for the tourist spot in the video.

11. The non-transitory computer-readable recording medium according to claim 1, wherein the computer is further configured to:

generate the tourist route information based on information relevant to the tour-guide person, the base location, and the region information.

12. The non-transitory computer-readable recording medium according to claim 1, wherein the computer is further configured to:

provide the terminal device to display user's reviews of the region affiliated person or the region information in association with the region affiliated person or the region information.

13. The non-transitory computer-readable recording medium according to claim 1, wherein the computer is further configured to:

accept a selection of the region information;

after accepting the selection, continuously acquire the location information of the terminal device while controlling to display the region information of the selected region affiliated person; and provide the terminal device with the posted region information corresponding to the acquired location information.

14. The non-transitory computer-readable recording medium according to claim 1, wherein the computer is further configured to:

provide display information to the terminal device using Augmented Realty (AR), the display information including a description of an object in the guided tour based on the region information; and accept an update of the description of the object by a user of the terminal device.

15. The non-transitory computer-readable recording medium according to claim 1, wherein the computer is further configured to:

receive an update of the location information from the terminal device; and upon receiving the update, control to display the region information posted by the region affiliated person corresponding to the updated location information.

16. The non-transitory computer-readable recording medium according to claim 1, wherein the computer is further configured to:

register a user of the terminal device as a local member of a region according to a history of the location information of the terminal device; and provide information of the registered local member with a given level to the terminal device.

17. The non-transitory computer-readable recording medium according to claim 1, wherein the computer is further configured to:

control to display information of other users in the region corresponding to the acquired location information of the terminal device.

18. The non-transitory computer-readable recording medium according to claim 1, wherein the computer is further configured to:

accept requests on the region information from a plurality of the users; and control to display the region information in response to the requests from the plurality of the users.

19. An information processing method to be executed by a computer, the method comprising:

receiving location information from a terminal device, the location information indicating a location of the terminal device;

identifying, from among data stored in the computer, region information based on the location information, the region information being posted by a region affiliated person, the region affiliated person being a person affiliated with a region including the location, and the region affiliated person including a tour-guide person;

sending the region information to the terminal device, the region information including information relevant to accepting a reservation for a on-site human guided tour of a tourist spot conducted by the tour-guide person, and contents relevant to a non-human guided tour of the tourist spot provided by the tour-guide person;

sending display selection information to the terminal device, to display a guide type selection screen on the user terminal device, the guide type selection screen including an icon for the reservation of the human guided tour and an icon for the non-human guided tour; and in response to a selection of the guide type from the terminal device, accepting the selection of the guide type.

20. A server device comprising:

circuitry configured to receive location information from a terminal device, the location information indicating a location of the terminal device;

identify, from among data stored in the computer, region information based on the location information, the region information being posted by a region affiliated person, the region affiliated person being a person affiliated with a region including the location, and the region affiliated person including a tour-guide person;

send the region information to the terminal device, the region information including information relevant to accepting a reservation for a on-site human guided tour of a tourist spot conducted by the tour-guide person, and contents relevant to a non-human guided tour of the tourist spot provided by the tour-guide person;

send display selection information to the terminal device, to display a guide type selection screen on the user terminal device, the guide type selection screen including an icon for the reservation of the human guided tour and an icon for the non-human guided tour; and in response to a selection of the guide type from the terminal device, accept the selection of the guide type.

* * * * *